United States Patent
Ryu et al.

(10) Patent No.: US 11,729,812 B2
(45) Date of Patent: Aug. 15, 2023

(54) PREEMPTION AND CANCELLATION IN SIDELINK AND UPLINK ACCESS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Jelena Damnjanovic, Del Mar, CA (US); Juan Montojo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/179,216

(22) Filed: Feb. 18, 2021

(65) Prior Publication Data
US 2021/0266928 A1    Aug. 26, 2021

Related U.S. Application Data

(60) Provisional application No. 62/979,981, filed on Feb. 21, 2020.

(51) Int. Cl.
*H04W 72/566* (2023.01)
*H04W 72/1268* (2023.01)

(52) U.S. Cl.
CPC ..... *H04W 72/569* (2023.01); *H04W 72/1268* (2013.01)

(58) Field of Classification Search
CPC ......... H04W 72/1242; H04W 72/1268; H04W 72/1289
See application file for complete search history.

(56) References Cited

U.S. PATENT DOCUMENTS 10,383,135 B2 * 8/2019 Kim ................ H04W 72/12
2019/0124634 A1   4/2019 Li et al.

FOREIGN PATENT DOCUMENTS

EP      2958397 A1 * 12/2015 ........... H04L 1/0003
WO  WO-2016184296 A1 * 11/2016 ........... H04W 40/22

OTHER PUBLICATIONS

CAICT: "Considerations on Pre-emption Issue in RA of NR V2X Sidelink Design", 3GPP Draft, 3GPP TSG RAN WG1 Ad-Hoc Meeting 1901, R1 -1901127, 3rd Generation Partnership Project (3GPP), Mobile Competence Centre, 650, Route Des Lucioles, F-06921, Sophia-Antipolis Cedex, France, vol. RAN WG1, No. Taipei, Jan. 25, 2019-Feb. 1, 2019 ,Jan. 20, 2019 (Jan. 20, 2019), XP051593971, 8 Pages, Retrieved from the Internet: URL: http://www.3gpp.org/ftp/Meetings%5F3GPP%5FSYNC/RAN1/Docs/R1%2D1901127%2Ezip [retrieved on Jan. 20, 2019] p. 2, Paragraph 2.2, Pre-Emption Scenarios—p. 3 p. 4, Paragraph 2.3 Pre-Emption Signalling Procedures—p. 6, p. 5 Lines 6-13 Figure 7.

(Continued)

*Primary Examiner* — Dinh Nguyen
(74) *Attorney, Agent, or Firm* — Loza & Loza LLP

(57) ABSTRACT

Aspects relate to obtaining, at a first scheduled entity, a first priority ranking of first uplink (UL) data scheduled for transmission to a scheduling entity and a first data scheduled for transmission to a second scheduled data, as well as a second priority ranking of second data scheduled for transmission to a third and fourth scheduled entity, respectively. The scheduling uses at least a portion of a sidelink resource reserved for sidelink communication for the transmissions. The scheduling of the transmissions using at least the portion of the sidelink resource are based on the first priority ranking and the second priority ranking. Various transmission cancellation and reception preemptions are transmitted from transmitting scheduled entities to other transmitting or receiving scheduled entities, respectively. Such cancella- (Continued)

tions and preemptions are based on the priority rankings, prediction of data transmission collisions and prediction of interference at receiving entities.

30 Claims, 16 Drawing Sheets

(56) References Cited

OTHER PUBLICATIONS

International Search Report and Written Opinion—PCT/US2021/018793—ISA/EPO—dated Oct. 26, 2021.

* cited by examiner

PREEMPTION AND CANCELLATION IN SIDELINK AND UPLINK ACCESS

CROSS-REFERENCE TO RELATED APPLICATIONS

This application for patent claims priority to and the benefit of provisional patent application No. 62/979,981 entitled "Preemption and Cancellation in Sidelink and Uplink Access" filed in the United States Patent and Trademark Office on Feb. 21, 2020, the entire content of which is incorporated herein by reference as if fully set forth below in its entirety and for all applicable purposes.

TECHNICAL FIELD

The technology discussed below relates generally to wireless communication systems, and more particularly, to adapting wireless communication system resources in view of traffic prioritization.

INTRODUCTION

Wireless communication between wireless devices may be facilitated using one or more communication links. For example, an access link is a communication link between a user equipment (UE) (e.g., a wireless communication device or scheduled entity) and a network access node (e.g., an eNB, a gNB, or a scheduling entity). In addition, a sidelink is a communication link between two wireless communication devices (e.g., between two UEs or between two scheduled entities). Sidelink communication may encompass, for example, device to device (D2D) communications, vehicle to vehicle (V2V) communications, and/or vehicle to everything (V2X) communications. Both access and sidelink communication may utilize beamforming to direct transmissions (and focus receptions) in space, thus allowing for spatial diversity.

For access communication, there are various priorities that may be assigned to different types of traffic (referred to herein as data traffic or data). For example, a first priority may be assigned to enhanced mobile broadband (eMBB) data traffic. Today, eMBB data accounts for most of the access downlink (DL) and uplink (UL) data traffic. A second priority may be assigned to ultra-reliable low latency communication (URLLC). URLLC applications are time sensitive. Because of the low latency requirement, URLLC data traffic has a higher priority than eMBB data traffic. In some examples, URLLC data traffic may need to be transmitted as soon as the data arrives at a source. In this context, the source is a network access node (e.g., an eNB, a gNB) or scheduling entity for downlink data traffic or a UE or scheduled entity for uplink data traffic. For example, in the downlink, when DL URLLC arrives in the network access node buffer, the network access node may discontinue transmitting eMBB DL data traffic to start transmitting DL URLLC data traffic.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one aspect, a method of wireless communication at a scheduling entity in a wireless communication network is disclosed. The method includes obtaining a first priority ranking of first uplink (UL) data for a first UL data transmission from a first scheduled entity to the scheduling entity, obtaining a second priority ranking of second data scheduled for a second data transmission from a second scheduled entity to a third scheduled entity using at least a portion of a sidelink resource reserved for sidelink communication, and scheduling the first UL data transmission using at least the portion of the sidelink resource based on the first priority ranking and the second priority ranking.

An example of an apparatus configured as a scheduling entity for wireless communication in a wireless communication network is disclosed. The apparatus includes a processor, a transceiver communicatively coupled to the processor, and a memory communicatively coupled to the processor. According to one aspect, the processor is configured to obtain a first priority ranking of first uplink (UL) data for a first UL data transmission from a first scheduled entity to the scheduling entity, obtain a second priority ranking of second data scheduled for a second data transmission from a second scheduled entity to a third scheduled entity using at least a portion of a sidelink resource reserved for sidelink communication, and schedule the first UL data transmission using at least the portion of the sidelink resource based on the first priority ranking and the second priority ranking.

According to another aspect, another method of wireless communication at a scheduling entity in a wireless communication network is disclosed. The method includes obtaining a first priority ranking of first data for a first data transmission from a first scheduled entity to a second scheduled entity using at least a portion of a sidelink resource reserved for sidelink communication, obtaining a second priority ranking of second data scheduled for a second data transmission from a third scheduled entity to a fourth scheduled entity using at least the portion of the sidelink resource reserved for sidelink communication, and scheduling the first data transmission of the first data using at least the portion of the sidelink resource based on the first priority ranking and the second priority ranking.

Another example of an apparatus for wireless communication is disclosed. The apparatus includes a processor, a transceiver communicatively coupled to the processor, and a memory communicatively coupled to the processor. In some aspects, the processor is configured to obtain a first priority ranking of a first data for a first data transmission from a first scheduled entity to a second scheduled entity using at least a portion of a sidelink resource reserved for sidelink communication, obtain a second priority ranking of second data scheduled for a second data transmission from a third scheduled entity to a fourth scheduled entity using at least the portion of the sidelink resource, and schedule the first data transmission of the first data using at least the portion of the sidelink resource based on the first priority ranking and the second priority ranking.

These and other aspects of the invention will become more fully understood upon a review of the detailed description, which follows. Other aspects and features will become apparent to those of ordinary skill in the art upon reviewing the following description of specific examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while examples may be discussed below as device, system, or method examples it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence (AI) enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
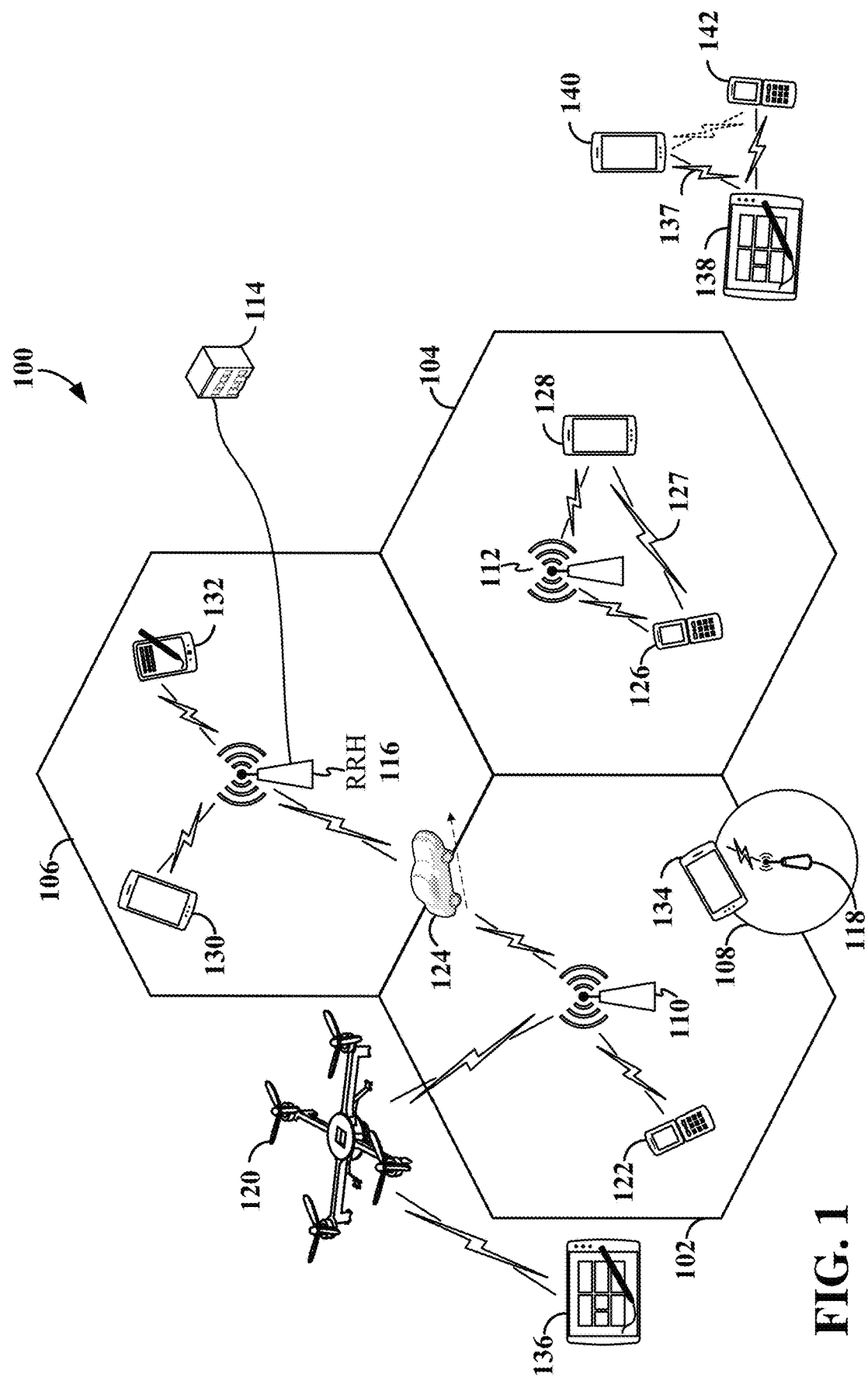
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
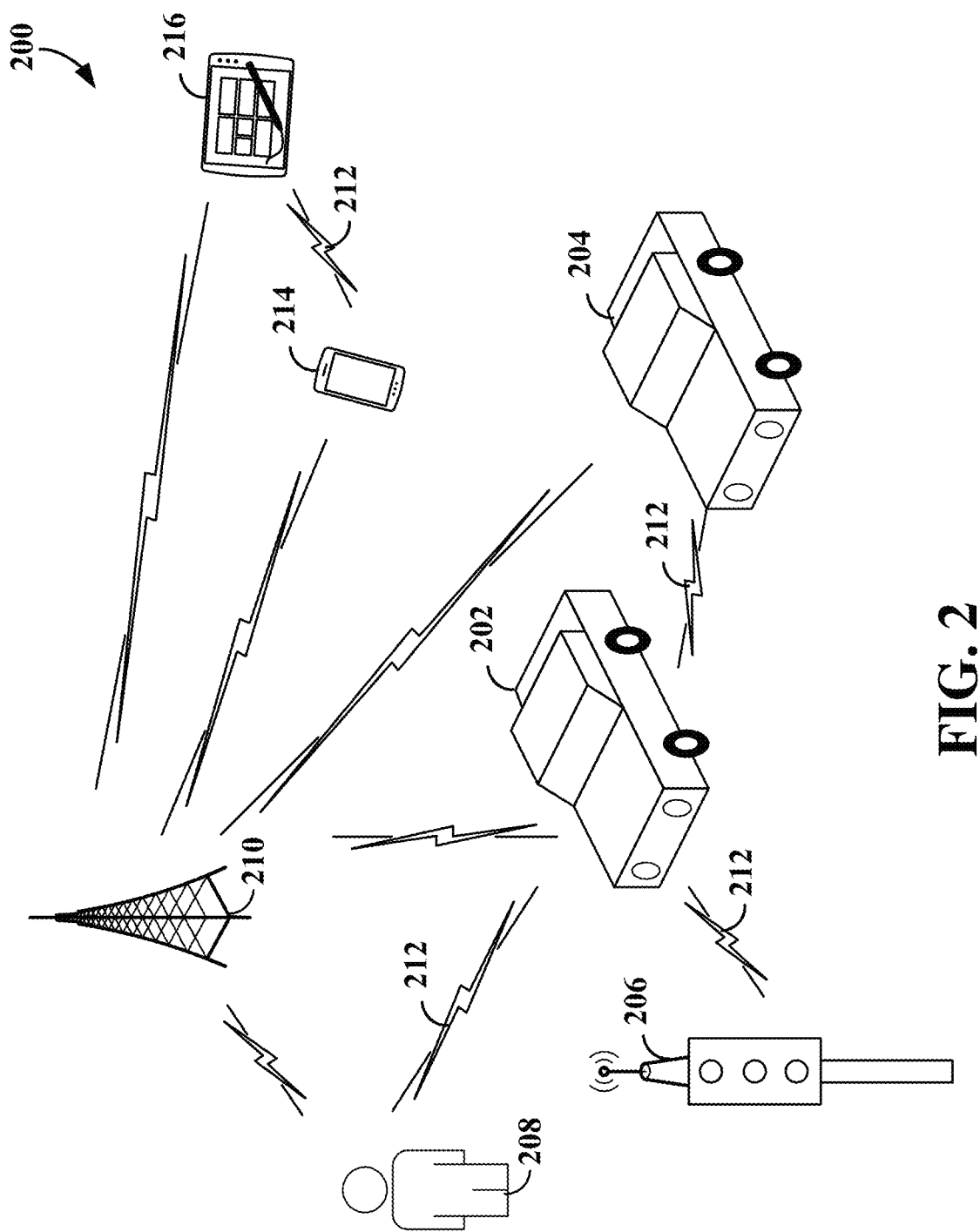
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Figure 3:
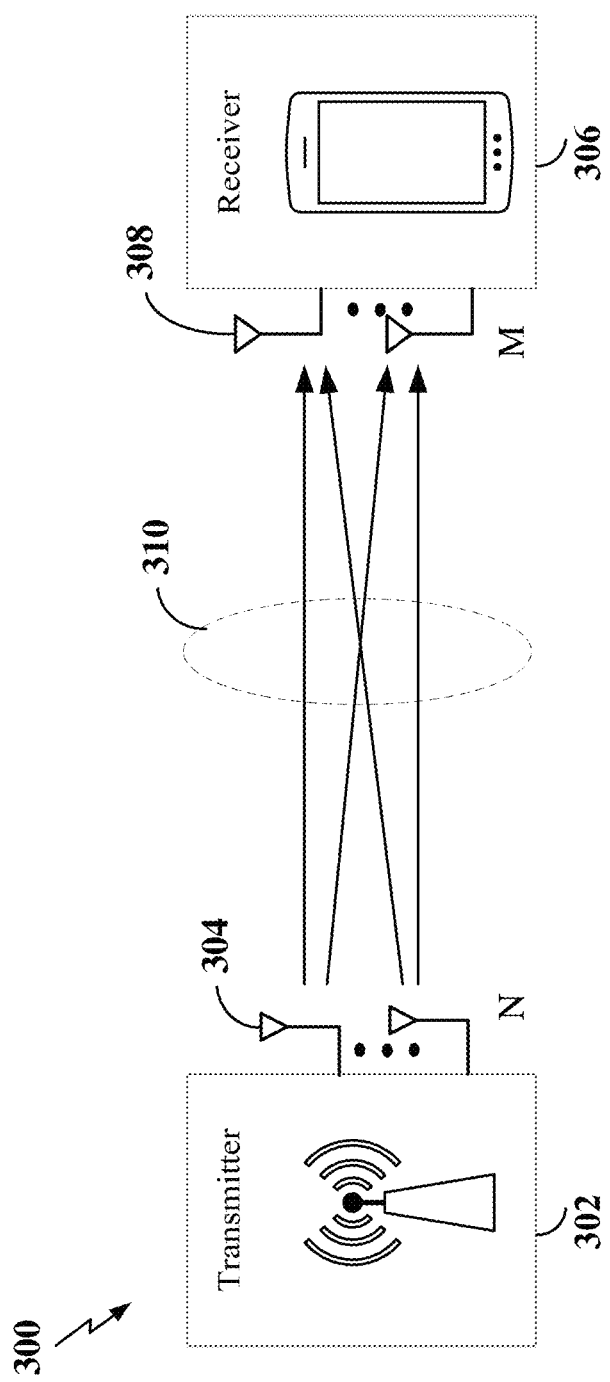
FIG. 3 is a schematic illustration of a wireless communication system supporting multiple-input multiple-output (MIMO) communication according to some aspects of the present disclosure.

In some aspects of the disclosure, the scheduling entity and/or scheduled entity may be configured for beamforming and/or multiple-input multiple-output (MIMO) technology. FIG. 3 is a schematic illustration of a wireless communication system 300 supporting MIMO according to some aspects of the present disclosure. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 110, a scheduled entity 122, or any other suitable wireless communication device.

The use of such multiple antenna technology enables the wireless communication system 300 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 300 supporting MIMO) is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit a channel state information—reference signal (CSI-RS) with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each of the transmit antennas 304. Each data stream reaches each of the receive antennas 308 along a different one of the signal paths 310. The receiver 306 may then reconstruct the data streams using the received signals from each of the receive antennas 308.

Various aspects of the present disclosure will be described with reference to an OFDM waveform, schematically illustrated in FIG. 4. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms.

Figure 4:
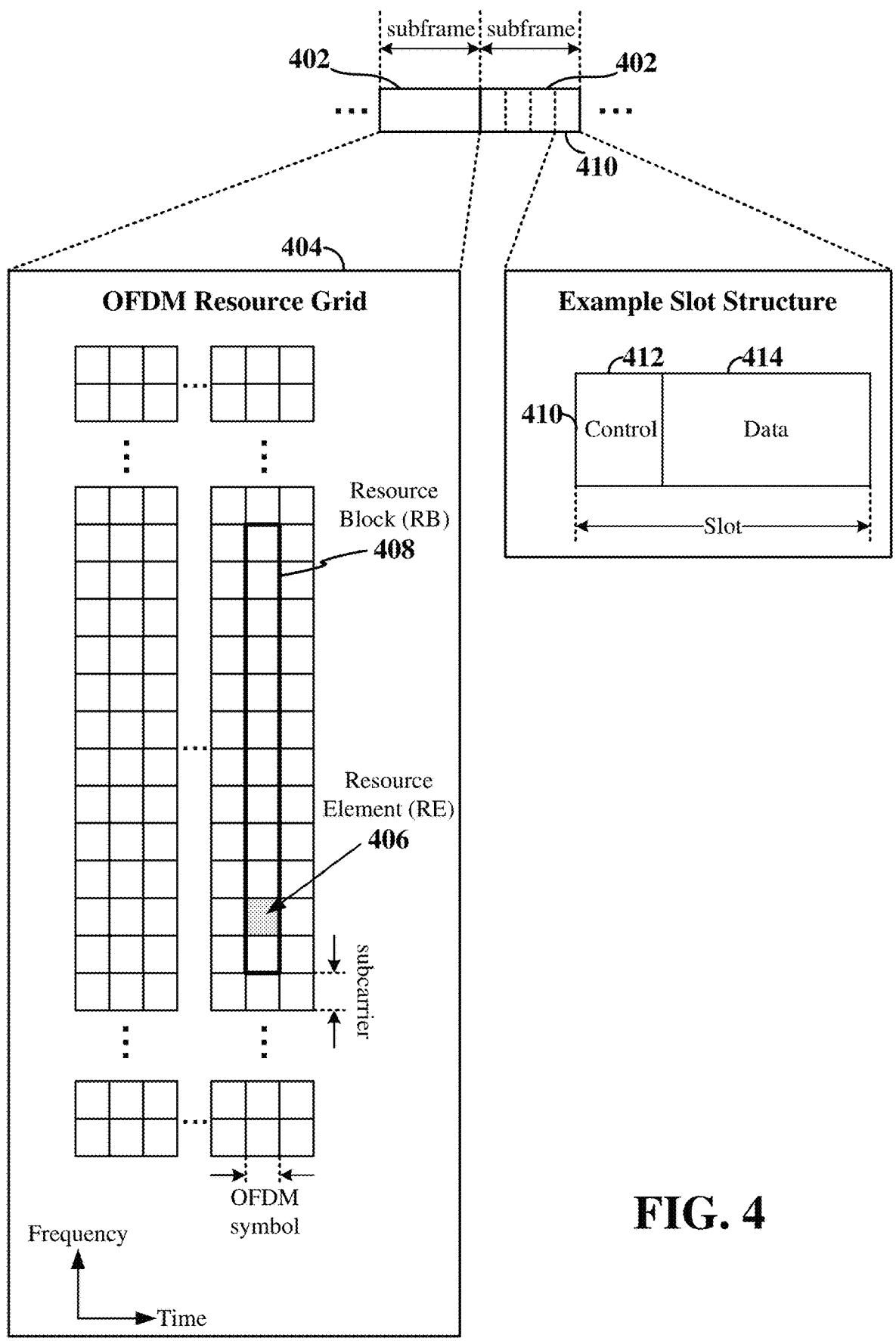
FIG. 4 is a schematic illustration of an organization of wireless resources in an air interface utilizing orthogonal frequency divisional multiplexing (OFDM) according to some aspects of the present disclosure.

Referring now to FIG. 4, an expanded view of an exemplary subframe 402 is illustrated, showing an OFDM resource grid 404. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time—frequency resources for a given antenna port. That is, in a multiple-input multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs or sidelink devices (hereinafter collectively referred to as UEs) for downlink, uplink, or sidelink transmissions may involve scheduling one or more resource elements 406 within one or more sub-bands. Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

According to some examples, a frame may refer to a duration of 10 ms, with each frame sub-divided into 10 subframes 402 of 1 ms each. Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, 4, or 7 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to, power control commands (e.g., one or more open loop power control parameters and/or one or more closed loop power control parameters), scheduling information, a grant, and/or an assignment of REs for DL and UL transmissions.

The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for traffic (e.g., user data). Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRS.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X or other Tx UE) towards a set of one or more other receiving sidelink devices (e.g., Rx V2X device or another Rx UE). The data region 414 of the slot 410 may include a physical sidelink shared channel (PSSCH) including sidelink traffic (e.g., user data) transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above and illustrated in FIGS. 1-4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 5:
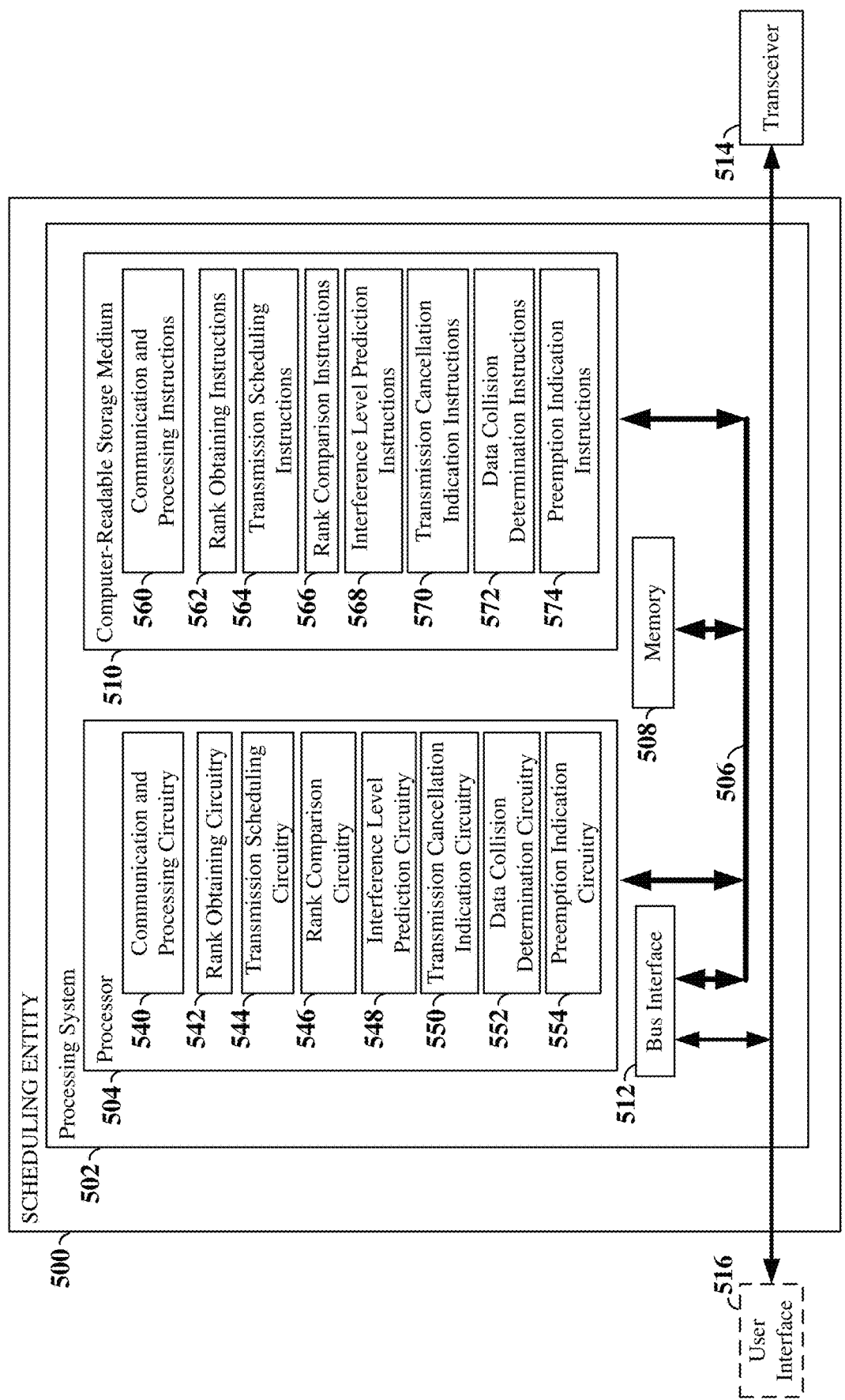
FIG. 5 is a block diagram illustrating an example of a hardware implementation of a scheduling entity according to some aspects of the present disclosure.

FIG. 5 is a block diagram illustrating an example of a hardware implementation of a scheduling entity 500 (e.g., an apparatus configured as a scheduling entity) according to some aspects of the present disclosure. In accordance with various aspects of the disclosure, an element, or any portion of an element, or any combination of elements may be implemented with a processing system 502 that includes one or more processors, such as processor 504. For example, the scheduling entity 500 may correspond to any of the base stations (e.g., eNBs or gNBs) illustrated in FIGS. 1, 2, and/or 3.

The scheduling entity 500 may be implemented with a processing system 502 that includes one or more processors, such as processor 504. Examples of processors (e.g., processor 504) include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 504 may in some instances be implemented via a baseband or modem chip and in other implementations, the processor 504 may itself include a number of devices distinct and different from a baseband or modem chip (e.g., in such scenarios is may work in concert to achieve examples discussed herein). And as mentioned above, various hardware arrangements and components outside of a baseband modem processor can be used in implementations, including RF-chains, power amplifiers, modulators, buffers, interleavers, adders/summers, etc. In various examples, the scheduling entity 500 may be configured to perform any one or more of the functions described herein. That is, the processor 504, as utilized in the scheduling entity 500, may be used to implement any one or more of the processes described below and illustrated, for example, in FIGS. 11-15.

In this example, the processing system 502 may be implemented with a bus architecture, represented generally by the bus 506. The bus 506 may include any number of interconnecting buses and bridges depending on the specific application of the processing system 502 and the overall design constraints. The bus 506 communicatively couples together various circuits including one or more processors (represented generally by the processor 504), a memory 508, and computer-readable media (represented generally by the computer-readable storage medium 510). The computer-readable storage medium 510 may be referred to as a non-transitory computer-readable storage medium. The computer-readable storage medium 510 may store computer-executable code. The computer executable code may include code to cause a computer (e.g., a processor of the computer) to implement one or more of the functions described herein. The bus 506 may also link various other circuits such as timing sources, peripherals, voltage regulators, and power management circuits, which are well known in the art, and therefore, will not be described any further. A bus interface 512 provides an interface between the bus 506 and a transceiver 514. The transceiver 514 may be a wireless transceiver. The transceiver 514 provides a communication interface or means for communicating with various other apparatus over a transmission medium. An antenna or antenna array (not shown) may be coupled to the transceiver 514 to transmit energy into and receive energy from the transmission medium. Depending upon the nature of the apparatus, a user interface 516 (e.g., keypad, display, speaker, microphone, joystick) may also be provided. Of course, such a user interface 516 is optional, and may be omitted in some examples, such as a base station.

The processor 504 is responsible for managing the bus 506 and general processing, including the execution of software stored on the computer-readable storage medium 510. The software, when executed by the processor 504, causes the processing system 502 to perform the various functions described below for any particular apparatus. The computer-readable storage medium 510 and the memory 508 may also be used for storing data that is manipulated by the processor 504 when executing software.

One or more processors, such as processor 504 in the processing system 502 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 510. The computer-readable storage medium 510 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 510 may reside in the processing system 502, external to the processing system 502, or distributed across multiple entities including the processing system 502. The computer-readable storage medium 510 may be embodied in a computer program product. By way of example, a computer program product may include the computer-readable storage medium 510 in packaging materials. Those skilled in the art will recognize how best to implement the described functionality presented throughout this disclosure depending on the particular application and the overall design constraints imposed on the overall system.

In some aspects of the disclosure, the processor 504 may include communication and processing circuitry 540 configured for various functions, including for example communicating with a scheduled entity (e.g., a UE), a network core (e.g., a 5G core network), or any other entity, such as, for example, local infrastructure. In some examples, the communication and processing circuitry 540 may include one or more hardware components that provide a physical structure that performs processes related to wireless communication (e.g., signal reception and/or signal transmission) and signal processing (e.g., processing a received signal and/or processing a signal for transmission). The communication and processing circuitry 540 may further be configured to execute communication and processing instructions 560 (e.g., software) stored on the computer-readable storage medium 510, to implement one or more functions described herein including one or more of the functions described below in relation to FIGS. 7-16.

Figure 6:
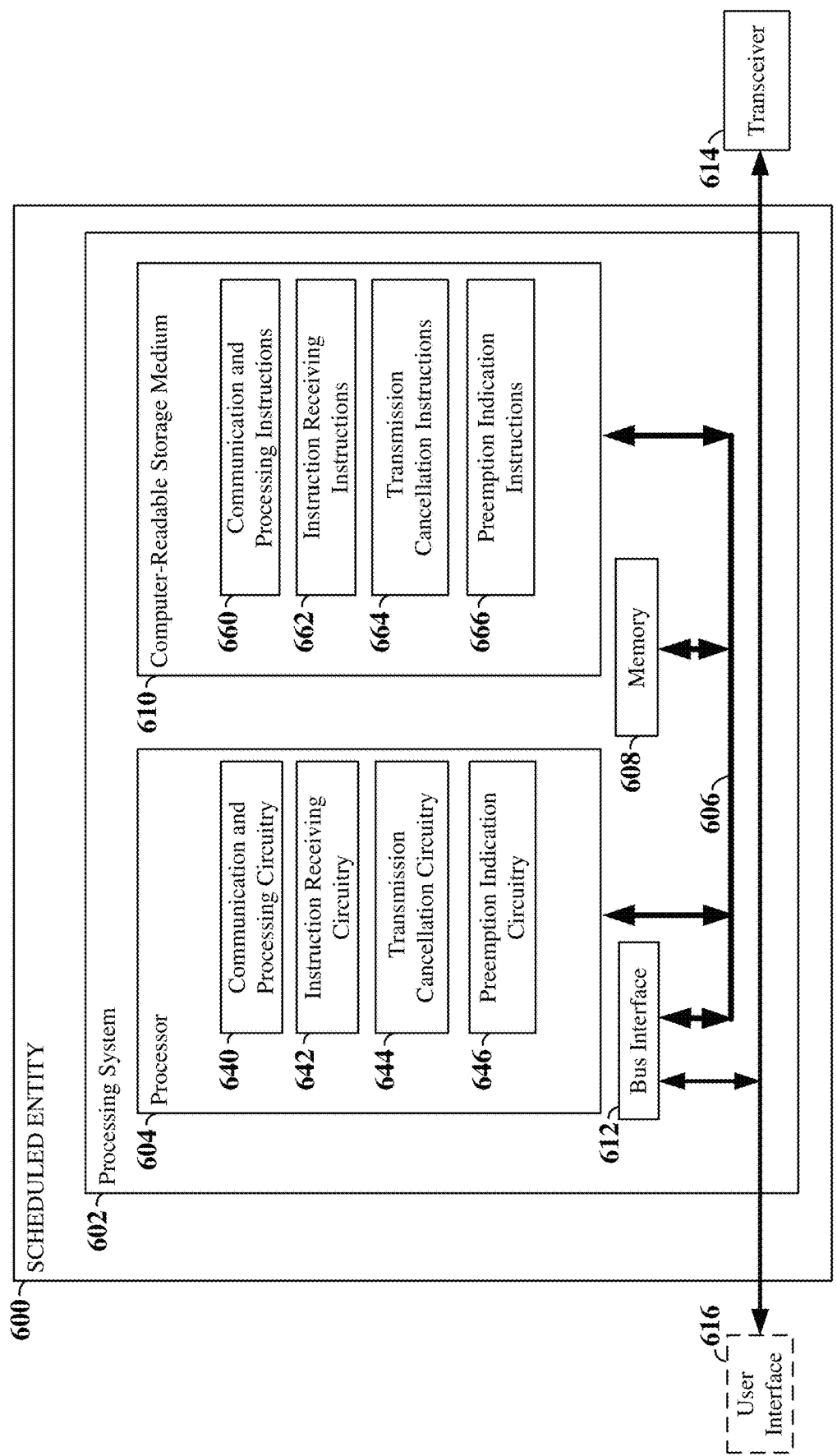
FIG. 6 is a block diagram illustrating an example of a hardware implementation of a scheduled entity according to some aspects of the present disclosure.
Figure 7:
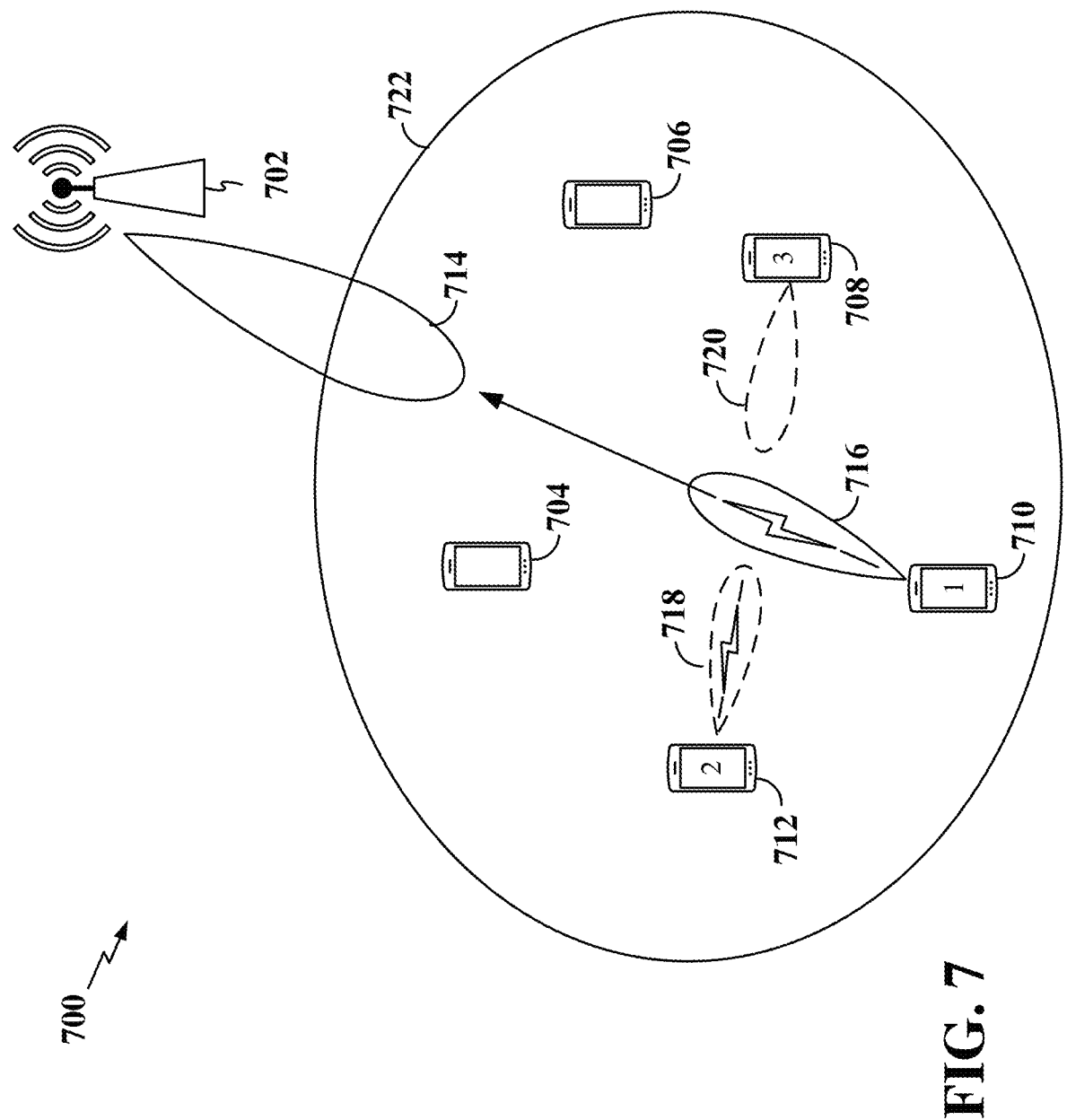
FIG. 7 is a schematic illustration of an example of a wireless communication system according to some aspects of the present disclosure.
Figure 8:
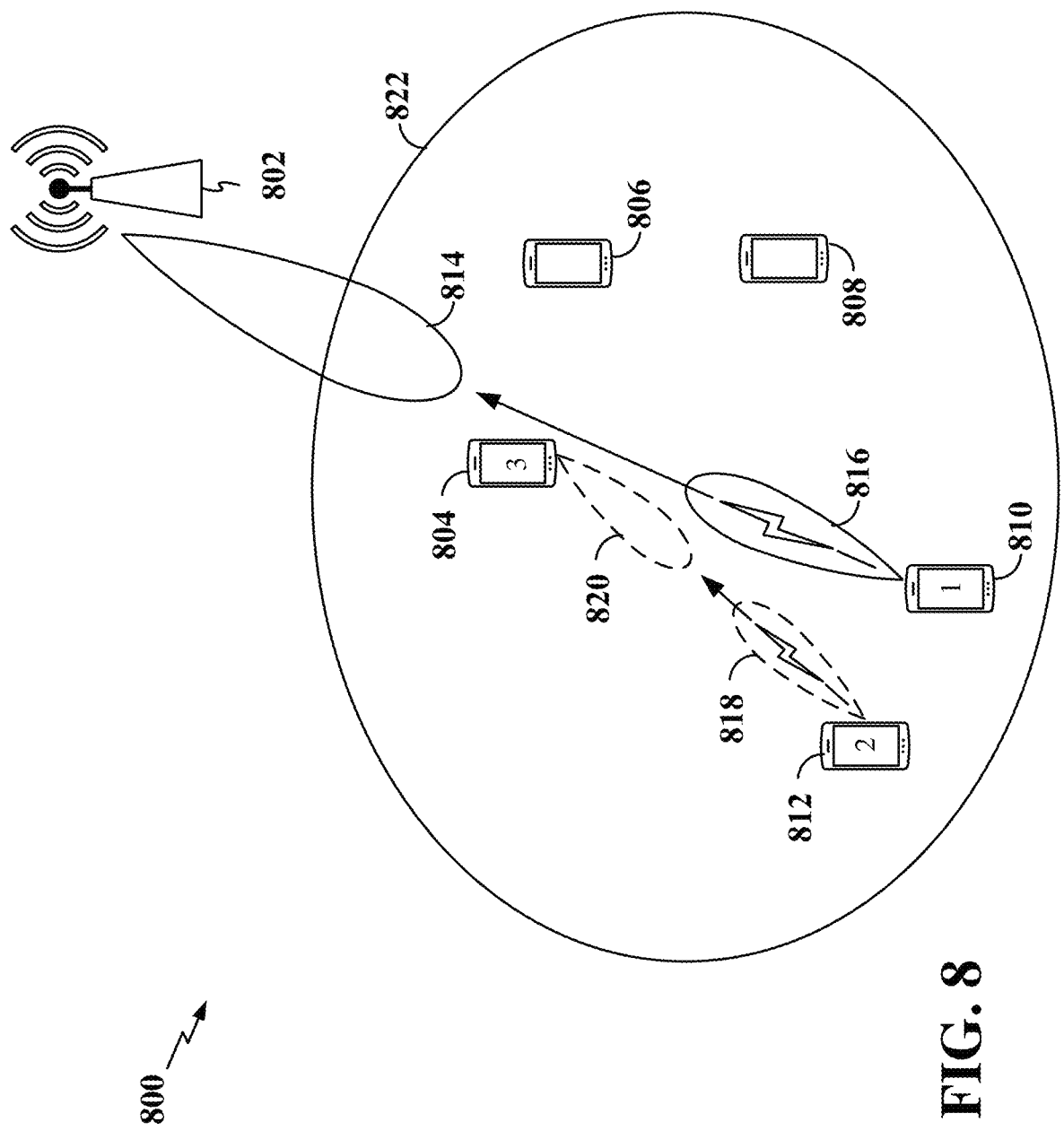
FIG. 8 is a schematic illustration of another example of a wireless communication system according to some aspects of the present disclosure.
Figure 9:
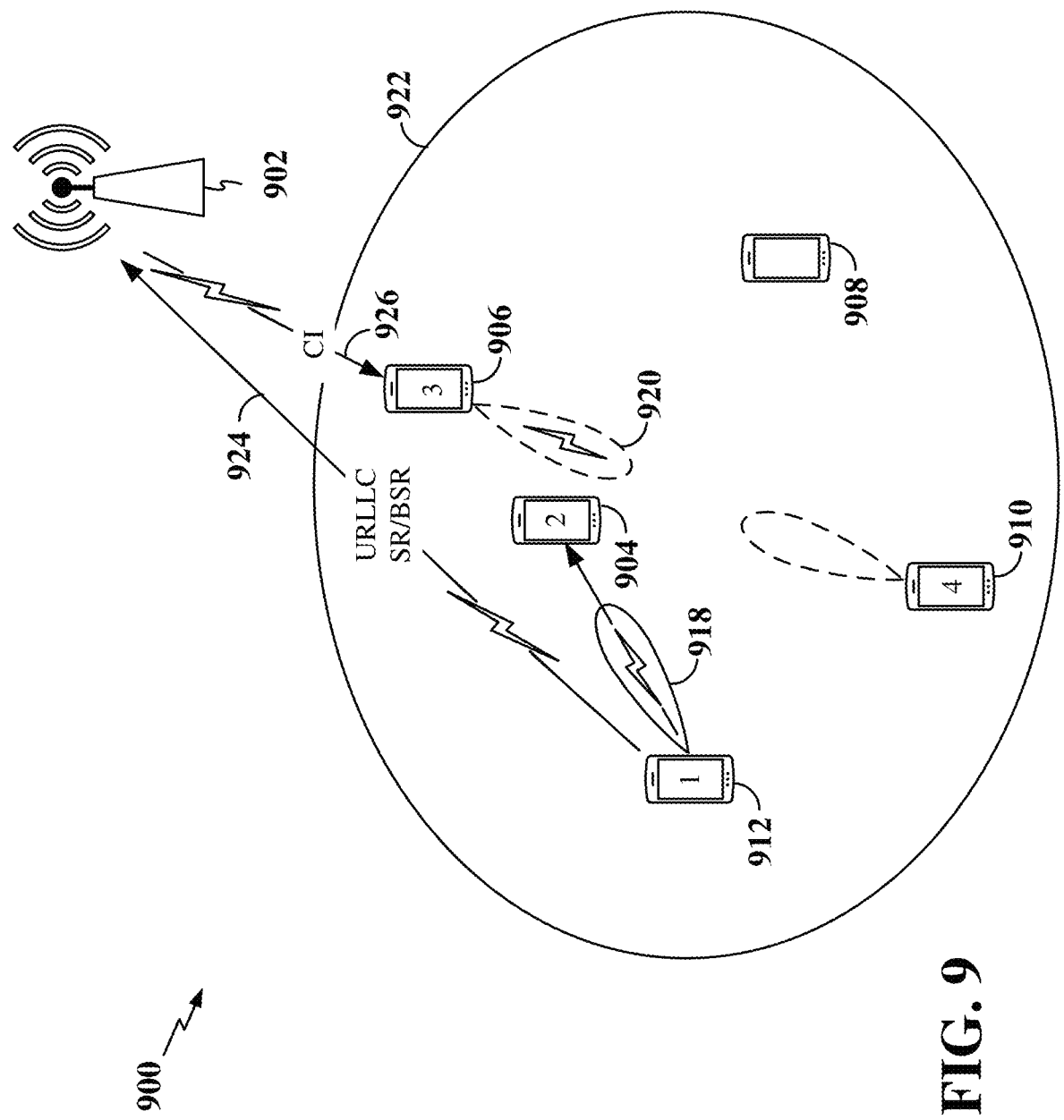
FIG. 9 is a schematic illustration of another example of a wireless communication system according to some aspects of the present disclosure.
Figure 10:
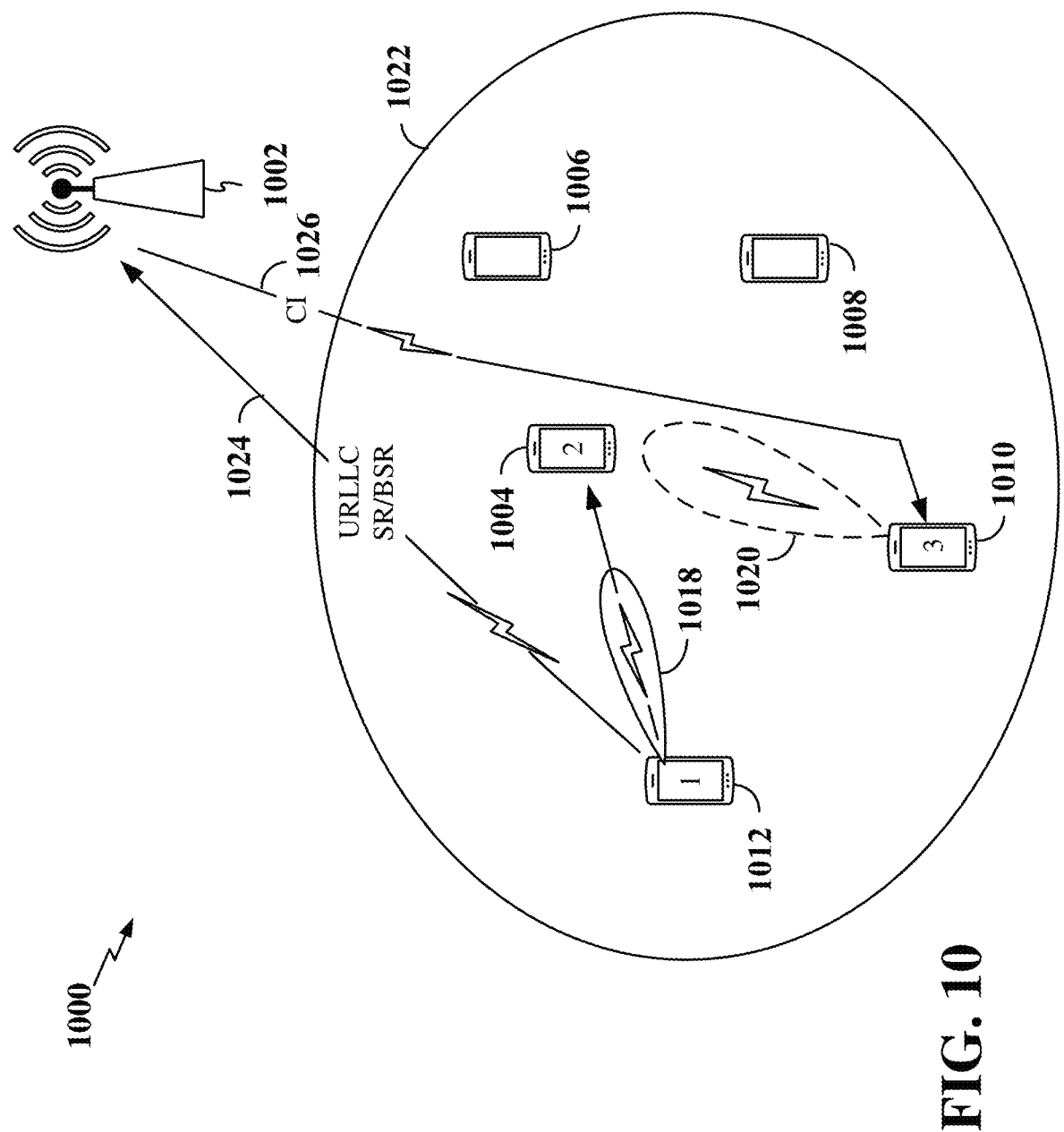
FIG. 10 is a schematic illustration of another example of a wireless communication system according to some aspects of the present disclosure.

In some aspects of the disclosure, the processor 504 may include rank obtaining circuitry 542 configured for various functions, including, for example, obtaining a first priority ranking of first uplink (UL) data for a first UL data transmission from a first scheduled entity, such as scheduled entity 600 of FIG. 6, 710 of FIG. 7, 810 of FIG. 8, 912 of FIG. 9, or 1012 of FIG. 10, to the scheduling entity 500. The scheduling entity may correspond to any of the scheduling entities described herein, such as scheduling entity 500 of FIG. 5, 702 of FIG. 7, 802 of FIG. 8, 902 of FIG. 9, and 1002 of FIG. 10. The rank obtaining circuitry 542 may additionally or alternatively be configured for various functions, including, for example, obtaining a second priority ranking of second data (e.g., sidelink data) scheduled for a second data transmission from a second scheduled entity such as scheduled entity 600 of FIG. 6, 712 of FIG. 7, 812 of FIG. 8, 904 of FIG. 9, or 1004 of FIG. 10 to a third scheduled entity, such as scheduled entity 600 of FIG. 6, 708 of FIG. 7, 804 of FIG. 8, 906 of FIG. 9, and 1010 of FIG. 10. The transmission from the second scheduled entity to the third scheduled entity may use at least a portion of a sidelink resource (e.g., a predetermined frequency and time resource). The sidelink resource may be reserved for sidelink communication. For example, the rank obtaining circuitry 542 may be configured to implement one or more of the functions described below in relation to, for example, FIG. 11, including blocks 1102 and 1104, FIG. 12, including blocks 1202 and 1204, FIG. 13, including blocks 1302 and 1304, FIG. 14, including blocks 1402 and 1404, or FIG. 15, including or blocks 1502 and 1504. The rank obtaining circuitry 542 may further be configured to execute rank obtaining instructions 562 (e.g., software) stored on the computer-readable storage medium 510 to implement one or more functions described herein including one or more of the functions described below in relation to, for example, FIG. 11, including blocks 1102 and 1104, FIG. 12, including blocks 1202 and 1204, FIG. 13, including blocks 1302 and 1304, FIG. 14, including blocks 1402 and 1404, or FIG. 15, including or blocks 1502 and 1504.

In some aspects of the disclosure, the processor 504 may include transmission scheduling circuitry 544 configured for various functions, including, for example, scheduling a first UL data transmission of the first UL data using at least a portion of the sidelink resource and/or scheduling a second data transmission of the second data using at least the portion of the sidelink resource. The scheduling may occur in view of priority rankings. For example, the transmission scheduling circuitry 544 may schedule the first UL data transmission of the first UL data using at least a portion of the sidelink resource and/or schedule a transmission of the second data using the sidelink resource based on the first priority ranking and the second priority ranking. According to some aspects, the scheduling circuitry 544 may schedule a transmission of the second data using the sidelink resource if the first priority ranking represents a greater priority than the second priority ranking. For example, the transmission scheduling circuitry 544 may be configured to implement one or more of the functions described below in relation to, for example, FIG. 11, including block 1106, FIG. 12, including blocks 1206 and 1208 and/or 1210, FIG. 13, including blocks 1312 and/or 1314, FIG. 14, including block 1406, or FIG. 15, including blocks 1506 and 1508 and/or 1510. The transmission scheduling circuitry 544 may further be configured to execute transmission scheduling instructions 564 (e.g., software) stored on the computer-readable storage medium 510 to implement one or more functions described herein including one or more of the functions described below in relation to, for example, FIG. 11, including block 1106, FIG. 12, including blocks 1206 and 1208 and/or 1210, FIG. 13, including blocks 1312 and/or 1314, FIG. 14, including block 1406, or FIG. 15, including blocks 1506 and 1508 and/or 1510.

In some aspects of the disclosure, the processor 504 may include rank comparison circuitry 546 configured for various functions, including, for example, comparing a first priority ranking (e.g., a first rank value) to a second priority ranking (e.g., a second rank value) to determine if the first priority ranking represents a greater priority than the second priority ranking. For example, the rank comparison circuitry 546 may be configured to implement one or more of the functions described below in relation to, for example, FIG. 11, including block 1106, FIG. 12, including block 1206, FIG. 13, including block 1308, FIG. 14, including block 1406, FIG. 15, including block 1506. The rank comparison circuitry 546 may further be configured to execute rank comparison instructions 566 (e.g., software) stored on the computer-readable storage medium 510 to implement one or more functions described herein including one or more of the functions described below in relation to, for example, FIG. 11, including block 1106, FIG. 12, including block 1206, FIG. 13, including block 1308, FIG. 14, including block 1406, FIG. 15, including block 1506.

In some aspects of the disclosure, the processor 504 may include interference level prediction circuitry 548 configured for various functions, including, for example, predicting a level of interference at the scheduling entity due to the second data transmission (of the second data from the second scheduled entity). For example, the interference level prediction circuitry 548 may be configured to implement one or more of the functions described below in relation to, for example, FIG. 12, including block 1214, FIG. 13, including block 1310, or, FIG. 15, including block 1514. The interference level prediction circuitry 548 may further be configured to execute interference level instructions 568 (e.g., software) stored on the computer-readable storage medium 510 to implement one or more functions described herein including one or more of the functions described below in relation to, for example, FIG. 12, including block 1214, FIG. 13, including block 1310, or, FIG. 15, including block 1514.

In some aspects of the disclosure, the processor 504 may include transmission cancellation indication circuitry 550 configured for various functions, including, for example, generating a transmission cancellation indication and/or sending the transmission cancellation indication to a scheduled entity to cancel transmission of the first data (e.g., the first sidelink data), the second data (e.g., the second sidelink data) or the first data and/or the first UL data (e.g., URLLC data). In one example, the transmission cancellation indication circuitry 550 may send a transmission cancellation indication to cancel the second data transmission (of the second data), if the second data transmission will collide with the first UL data transmission in at least one of: frequency or time. In another example, the transmission cancellation indication circuitry 550 may send a transmission cancellation indication to cancel the second data transmission (of the second data) or the first UL data based, for example, on priority ranking of each of the second data and the first UL data. In another example, the transmission cancellation indication circuitry 550 may send a transmission cancellation indication to cancel the second data transmission of the second data or the first UL data based, for example, on a predicted level of interference. For example, the transmission cancellation indication circuitry 550 may be configured to implement one or more of the functions described below in relation to, for example, FIG. 12, including blocks 1212 and 1216, FIG. 13, including blocks 1306, 1308, 1310, and 1316, or FIG. 15, including blocks 1514 and 1516. The transmission cancellation indication circuitry 550 may further be configured to execute transmission cancellation indication instructions 570 (e.g., software) stored on the computer-readable storage medium 510 to implement one or more functions described herein including one or more of the functions described below in relation to, for example, FIG. 12, including blocks 1212 and 1216, FIG. 13, including blocks 1306, 1308, 1310, and 1316, or FIG. 15, including blocks 1514 and 1516.

In some aspects of the disclosure, the processor 504 may include data collision determination circuitry 552 configured for various functions, including, for example, determining if the first data transmission will collide with the first UL data transmission in at least one of: frequency or time. In another example, the data collision determination circuitry 552 may be configured for various functions, including, for example, determining if the first data (e.g., the first sidelink data) and the second data (e.g., the second sidelink data), or the first data transmission and the first UL data transmission, will collide in at least one of: frequency or time. For example, the data collision determination circuitry 552 may be configured to implement one or more of the functions described below in relation to, for example, FIG. 13, including block 1306, or FIG. 15, including block 1512. The data collision determination circuitry 552 may further be configured to execute data collision determination instructions 572 (e.g., software) stored on the computer-readable storage medium 510 to implement one or more functions described herein including one or more of the functions described below in relation to, for example, FIG. 13, including block 1306, or FIG. 15, including block 1512.

In some aspects of the disclosure, the processor 504 may include preemption indication circuitry 554 configured for various functions, including, for example, sending a preemption indication to one or more scheduled entities, or, for example, sending a preemption indication to indicate that receiving scheduled entities (including the third scheduled entity) are to ignore data received during at least the portion of the sidelink resource. For example, the preemption indication circuitry 554 may be configured to implement one or more of the functions described below in relation to, for example, FIG. 12, including block 1218, FIG. 13, including block 1318, or FIG. 15, including block 1518. The preemption indication circuitry 554 may further be configured to execute preemption indication instructions 574 (e.g., software) stored on the computer-readable storage medium 510 to implement one or more functions described herein including one or more of the functions described below in relation to, for example, FIG. 12, including block 1218, FIG. 13, including block 1318, or FIG. 15, including block 1518.

FIG. 6 is a block diagram illustrating an example of a hardware implementation of a scheduled entity 600 (e.g., an apparatus configured as a scheduled entity) according to some aspects of the present disclosure. In accordance with various aspects of the disclosure, an element, or any portion of an element, or any combination of elements may be implemented with a processing system 602 that includes one or more processors, such as processor 604. For example, the scheduled entity 600 may correspond to any of the scheduled entities (e.g., UEs) illustrated in FIGS. 1, 2. and/or 3.

The scheduled entity 600 may be implemented with a processing system 602. The processing system 602 may be substantially the same as the processing system 502 illustrated in FIG. 5, including a bus interface 612, a bus 606, memory 608, a processor 604, and a computer-readable storage medium 610. The computer-readable storage medium 610 may be a non-transitory computer-readable storage medium. Furthermore, the scheduled entity 600 may include a user interface 616 and a transceiver 614 substantially similar to those described above in FIG. 5. That is, the processor 604, as utilized in a scheduled entity 600, may be used to implement any one or more of the processes described below and illustrated, for example, in FIG. 16.

In some aspects of the disclosure, the processor 604 may include communication and processing circuitry 640 configured for various functions, including for example communicating with a scheduling entity (e.g., a base station, an eNB, a gNB), another scheduled entity (e.g., a UE), or any other entity, such as, for example, local infrastructure. In some examples, the communication and processing circuitry 640 may include one or more hardware components that provide a physical structure that performs processes related to wireless communication (e.g., signal reception and/or signal transmission) and signal processing (e.g., processing a received signal and/or processing a signal for transmission). The communication and processing circuitry 640 may further be configured to execute communication and processing instructions 660 (e.g., software) stored on the computer-readable storage medium 610, to implement one or more functions described herein including one or more of the functions described below in relation to FIGS. 7-16.

In some aspects of the disclosure, the processor 604 may include instruction receiving circuitry 642 configured for various functions, including, for example, receiving, from a scheduling entity, an instruction to cancel a transmission of a first data scheduled for transmission using at least a portion of a sidelink resource reserved for sidelink communication. For example, the instruction receiving circuitry 642 may be configured to implement one or more of the functions described below in relation to FIG. 16, including, e.g., block 1602. The instruction receiving circuitry 642 may further be configured to execute instruction receiving instructions 662 (e.g., software) stored on the computer-readable storage medium 610 to implement one or more functions described herein including one or more of the functions described below in relation to FIG. 16, including, e.g., block 1602.

In some aspects of the disclosure, the processor 604 may include transmission cancellation circuitry 644 configured for various functions, including, for example, canceling a transmission in accordance with received instructions. For example, the transmission cancellation circuitry 644 may be configured to implement one or more of the functions described below in relation to FIG. 16, including, e.g., block 1604. The transmission cancellation circuitry 644 may further be configured to execute transmission cancellation instructions 664 (e.g., software) stored on the computer-readable storage medium 610 to implement one or more functions described herein including one or more of the functions described below in relation to FIG. 16, including, e.g., block 1604.

In some aspects of the disclosure, the processor 604 may include preemption indication circuitry 646 configured for various functions, including, for example, sending a preemption indication to at least one of a plurality of scheduled entities to indicate that the at least one of the plurality of scheduled entities is to ignore data (e.g., a signal) received during the sidelink resource in light of cancellation of the corresponding transmission, or, for example, sending a preemption indication to indicate that receiving scheduled entities (including the third scheduled entity) are to ignore data received during at least the portion of the sidelink resource. For example, the include preemption indication circuitry 646 may be configured to implement one or more of the functions described below in relation to FIG. 16, including, e.g., block 1606. The preemption indication circuitry 646 may further be configured to execute preemption indication instructions 666 (e.g., software) stored on the computer-readable storage medium 610 to implement one or more functions described herein including one or more of the functions described below in relation to FIG. 16, including, e.g., block 1606.

Presently, downlink control information (DCI) format 2_1 provides a way to send a preemption indication to a group of UEs (scheduled entities), to notify the group of UEs of the physical resource blocks (PRB(s)) and OFDM symbol(s) where no transmission is intended for a UE. The preemption indication is a mechanism for a gNB to inform a UE that the gNB was scheduled to transmit downlink data traffic to the UE, but the gNB did not transmit the downlink data traffic because some URLLC data traffic was transmitted instead. The preemption indication, therefore, informs a UE to refrain from decoding the data the UE found in its scheduled downlink resource, as the scheduled downlink resource was no longer applicable to the UE.

Additionally, in the uplink direction, if a first UE is scheduled to transmit uplink data (e.g., normal uplink data, such as eMBB uplink data) to a gNB in a first sidelink resource, but a second UE needs to transmit uplink URLLC data in the same resource, the gNB may schedule the second UEs uplink URLLC data for transmission in the first UEs transmit uplink resource, and will send a cancellation indication to the first UE, to inform the first UE that its uplink transmission resource is cancelled.

In a wireless communication system, when considering, for example, time division duplex (TDD) uplink slots, uplink slots can be scheduled by a network access node (e.g., a gNB, a scheduling entity) for uplink transmission from a UE (e.g., a scheduled entity) to the network access node. In addition, for transmissions between UEs (for example, sidelink communications), using mode 1 for example, the network access node (gNB) schedules the sidelink activities. That is, using the example of mode 1, the scheduling entity schedules the sidelink communications.

In the context of URLLC and sidelink communications, there may be three different scenarios. According to a first scenario, uplink URLLC data, which is URLLC traffic headed toward the scheduling entity from the scheduled entity, arrives in the buffer at the source (e.g., a UE, the scheduled entity). The uplink URLLC data may need to be transmitted to the scheduling entity using a frequency and time resource that was scheduled for sidelink communications. In this first scenario, the uplink URLLC data may preempt sidelink data (e.g., non-URLLC sidelink data, such as sidelink eMBB data).

According to a second scenario, sidelink URLLC data (e.g., high priority sidelink data) arrives in the buffer at a scheduled entity. The URLLC data may need to be transmitted in at least a portion of a sidelink resource that was already scheduled for normal sidelink data (e.g., non-URLLC sidelink data, such as sidelink eMBB data, or low priority sidelink data). In this scenario, the sidelink URLLC data may preempt the already scheduled normal sidelink data transmission.

According to a third scenario, sidelink URLLC data (e.g., high priority sidelink data) arrives in the buffer at a scheduled entity. The URLLC data may need to be transmitted in at least a portion of a sidelink resource that was already scheduled for normal uplink data (e.g., eMBB uplink data for transmission from the scheduled entity to a scheduling entity). In this scenario, the sidelink URLLC data may preempt the already scheduled normal uplink data transmission.

As described herein, there may be two levels of priority: normal (low) and URLLC (high); however, additional levels and gradations of levels may also be possible. For example, in sidelink transmissions, there may be three bits used to indicate up to 8 levels of priority. For sidelink data preempting other sidelink data, the three bits for each sidelink transmission may be compared. For uplink data (e.g., data transmitted from a scheduled entity to a scheduling entity) compared to sidelink data, there is presently no known method of comparing priority as the three bits used for sidelink priority are not used for comparing against uplink priority.

According to one aspect described herein, for uplink data compared to sidelink data, one method of comparison may be referred to herein as "thresholding." When implementing thresholding, a lower priority may be attributed to sidelink data with a priority between 0 and 5 (e.g., low priority) than a priority between 6 and 7 (e.g., high priority). According to one exemplary aspect, sidelink data with a priority between 0 and 5 may not be able to preempt uplink data, while sidelink data with a priority between 6 and 7 may be able to preempt uplink data; however, uplink URLLC data may preempt sidelink data of any priority and sidelink URLLC data (e.g., sidelink high priority data) may preempt normal (e.g., eMBB, non-URLLC) uplink data. The preceding was exemplary, other priority rankings and comparisons are within the scope of the disclosure.

FIG. 7 is a schematic illustration of an example of a wireless communication system 700 according to some aspects of the present disclosure. The wireless communication system 700 includes a scheduling entity 702, such as the scheduling entity 500 of FIG. 5, or a network access node or a gNB of any of FIG. 1, 2, or 3. In some examples, the scheduling entity 702 schedules sidelink communications (e.g., sidelink data). The sidelink data may be normal priority (e.g., eMBB data) or high priority (e.g., URLLC data). The sidelink data may be assigned a priority ranking (e.g., a rank value from 0 to 7). As in the example of mode 1 sidelink operation, the scheduling entity 702 may allocate sidelink resources for sidelink communications. According to some examples, a scheduling entity 702 allocates the frequency and time resources for sidelink communications in the same space (the same frequency and time resource) that would otherwise be used for uplink transmissions from user equipment (e.g., scheduled entities 704, 706, 708, 710, 712) to scheduling entity 702 (e.g., network access node or gNB).

In the schematic illustration of FIG. 7, high priority URLLC uplink data traffic (e.g., first uplink data) needs to be sent from a first scheduled entity 710 to the scheduling entity 702. The high priority URLLC uplink data traffic, or first uplink data, is represented by a transmit radiation lobe 716 emanating from first scheduled entity 710. In some examples, the first uplink data may need to be scheduled during the sidelink resource allocated for sidelink communications. Similar to the first scenario previously described, the uplink communication may preempt the sidelink communication. In accordance with one aspect, the scheduling entity 702 has a first priority ranking of the uplink data (first UL data) and a second priority ranking of the sidelink data (represented by a transmit radiation lobe 718) scheduled for transmission from a second scheduled entity 712 to a third scheduled entity 708 using at least a portion of a sidelink resource reserved for sidelink communication.

In other words, according to one aspect, the scheduling entity 702 obtains a first priority ranking of first uplink (UL) data (see transmit radiation lobe 716) for a first UL data transmission from a first scheduled entity 710 to the scheduling entity 702. The scheduling entity 702 obtains a second priority ranking of second data (see transmit radiation lobe 718) scheduled for a second data transmission from a second scheduled entity 712 to a third scheduled entity 708 using at least a portion of a sidelink resource reserved for sidelink communication. The scheduling entity 702 may schedule the transmission of the first UL data using at least a portion of the sidelink resource if the first priority ranking represents a greater priority than the second priority ranking.

For explanatory purposes, the high priority URLLC uplink data traffic (e.g., the first UL data) is represented as a solid line transmit radiation lobe 716 emanating from a first scheduled entity 710, and the sidelink data (e.g., the first data) is represented as a dashed line transmit radiation lobe 718 emanating from the second scheduled entity 712. The beamformed to receive the first UL data is represented as a solid line receive radiation lobe 714 emanating from the scheduling entity 702 and the beamformed to receive the first data is represented as a dashed line receive radiation lobe 720 emanating from the scheduled entity 708. The scheduled entities 704, 706, 708, 710, 712 of FIG. 7 may be scheduled to transmit or receive in the sidelink resource. These scheduled entities 704, 706, 708, 710, 712 may be referred to collectively as a sidelink network 722.

Due to the geometry of the various entities in FIG. 7, there will not be a need to send a cancellation indication to scheduled entity 712, as the transmit radiation lobe 718 of the scheduled entity 712 and the transmit radiation lobe 716 of scheduled entity 710 are perpendicular, so the transmitted signal from either may be received at a very low power by their respective receivers, and there may be no noticeable collision of the first UL data and the first data in either the frequency or time domains. For the same or similar reasons, a predicted level of interference (or measure a level of interference) at the scheduling entity 702 due to the second data transmission (of the second data from the second scheduled entity 712) may be small, and not likely to cross any predetermined threshold of interference power. Accordingly, it may not be necessary to cancel the transmission of the first data from scheduled entity 712.

FIG. 8 is a schematic illustration of another example of a wireless communication system 800 according to some aspects of the present disclosure. The wireless communication system 800 includes a scheduling entity 802, such as the scheduling entity 500 of FIG. 5, or a network access node or a gNB of any of FIG. 1, 2, or 3. The scheduling entity 802 schedules sidelink communications (e.g., sidelink data). The sidelink data may be normal priority (e.g., eMBB data) or high priority (e.g., URLLC data). The sidelink data may be assigned a priority ranking (e.g., a rank value from 0 to 7). As in the example of mode 1 sidelink operation, the scheduling entity 802 may allocate sidelink resources for sidelink communications. According to some examples, a scheduling entity 802 allocates the frequency and time resources for sidelink communications in the same space (the same frequency and time resource) that would otherwise be used for uplink transmissions from user equipment (e.g., scheduled entities 804, 806, 808, 810, 812) to the scheduling entity 802.

In the schematic illustration of FIG. 8, high priority URLLC uplink data traffic (e.g., first uplink data) needs to be sent from a first scheduled entity 810 to the scheduling entity 802. The high priority URLLC uplink data traffic, or first uplink data, is represented by a transmit radiation lobe 816 emanating from first scheduled entity 810. The first uplink data may need to be scheduled during the sidelink resource allocated for sidelink communications. Similar to the first scenario previously described, the uplink communication may preempt the sidelink communications. In accordance with one aspect, the scheduling entity 802 has a first priority ranking of the uplink data (first UL data) and a second priority ranking of the sidelink data (represented by a transmit radiation lobe 818) scheduled for transmission from a second scheduled entity 812 to a third scheduled entity 804 using at least a portion of a sidelink resource reserved for sidelink communication.

In other words, according to one aspect, the scheduling entity 802 obtains a first priority ranking of first uplink (UL) data (see transmit radiation lobe 816) for a first UL transmission from a first scheduled entity 810 to the scheduling entity 802. The scheduling entity 802 obtains a second priority ranking of second data (see transmit radiation lobe 818) scheduled for a second data transmission from a second scheduled entity 812 to a third scheduled entity 808 using at least a portion of a sidelink resource reserved for sidelink communication. The scheduling entity 802 may schedule a transmission of the first UL data using at least a portion of the sidelink resource based on the first priority ranking and the second priority ranking. For example, the scheduling entity 802 may schedule a transmission of the first UL data using at least the portion of the sidelink resource if the first priority ranking represents a greater priority than the second priority ranking.

For explanatory purposes, the high priority URLLC uplink data traffic (e.g., the first UL data) is represented as a solid line transmit radiation lobe 816 and the sidelink data (e.g., the first data) is represented as a dashed line transmit radiation lobe 818. The beamformed to receive the first UL data is represented as a solid line receive radiation lobe 814 emanating from the scheduling entity 802 and the beamformed to receive the first data is represented as a dashed line receive radiation lobe 820 emanating from the scheduled entity 804. The scheduled entities 806, 808, 810, 812 are all scheduled entities scheduled to transmit or receive in the sidelink resource and may be referred to as a sidelink network 822.

Due to the geometry of the various entities in FIG. 8, the scheduling entity 802 may send a cancellation indication to scheduled entity 812, as the transmit radiation lobe 818 of the scheduled entity 812 and the receive radiation lobe 814 of scheduling entity 802 are substantially in-line, so the transmitted signal from scheduled entity 812 may interfere with the transmitted signal from the first scheduled entity 810 received by receive radiation lobe 814 of the scheduling entity 802. For the same or similar reasons, data collisions between the first UL data transmitted from scheduled entity 810 and the first data transmitted from scheduled entity 812 may collide in at least one of: frequency or time.

FIG. 9 is a schematic illustration of another example of a wireless communication system 900 according to some aspects of the present disclosure. The wireless communication system 900 includes a scheduling entity 902, such as the scheduling entity 500 of FIG. 5, or a network access node or a gNB of any of FIG. 1, 2, or 3. The scheduling entity 902 schedules sidelink communications (e.g., sidelink data). The sidelink data may be normal priority (e.g., eMBB data) or high priority (e.g., URLLC data). The sidelink data may be assigned a priority ranking (e.g., a rank value from 0 to 7). As in the example of mode 1 sidelink operation, the scheduling entity 902 may allocate sidelink resources for sidelink communications. According to some examples, a scheduling entity 902 allocates the frequency and time resources for sidelink communications in the same space (the same frequency and time resource) that would otherwise be used for uplink transmissions from user equipment (e.g., scheduled entities 904, 906, 908, 910, 912) to the scheduling entity 902. The scheduled entities 904, 906, 908, 910, 912 are all scheduled entities scheduled to transmit or receive in the sidelink resource and may be referred to as a sidelink network 922.

In the schematic illustration of FIG. 9, high priority URLLC sidelink data (e.g., first data) needs to be sent from a first scheduled entity 912 to a second scheduled entity 904. The high priority URLLC sidelink data, or first data, is represented by a transmit radiation lobe 918 emanating from first scheduled entity 912. In some examples, the first data may need to be scheduled during the sidelink resource allocated for sidelink communications. Similar to the second scenario previously described, the high priority URLLC sidelink data, or first data, may preempt another (e.g., second data) sidelink communication. In accordance with one aspect, the scheduling entity 902 may obtain a first priority ranking of the first data and a second priority ranking of the second data (e.g., sidelink data represented by a transmit radiation lobe 920) scheduled for transmission from a third scheduled entity 906 to a fourth scheduled entity 910 using at least a portion of a sidelink resource reserved for sidelink communication.

The first scheduled entity 912 may transmit to the scheduling entity 902 some indication of the ranking priority of the first data. Accordingly, the scheduling entity 902 may obtain (e.g., receive from the first scheduled entity 912) at least one of: a scheduling request (SR) or a buffer status report (BSR) 924 from the first scheduled entity 912. The SR and/or BSR may indicate the ranking priority of the first data. The scheduling entity 902 knows the ranking priority of the sidelink second data (represented by transmit radiation lobe 920) (e.g., eMBB, non-URLLC, or low priority data) because the scheduling entity 902 scheduled the second data. Based on the ranking priorities, the scheduling entity 902 schedules the first data and may send a transmission cancellation indication (CI) 926 to the third scheduled entity 906. The transmission cancellation indication CI 926 may act to cancel transmission of the second data. The transmission cancellation indication may be sent, for example, if the second data transmission will collide with the first data transmission in at least one of: frequency or time. The CI 926 may stop the transmission of the second data and prevent interference with the first data. In another example, a preemption indication (PI) may be sent to a receiving scheduled entity. The PI may be sent from the scheduling entity 902 or the first scheduled entity 912. CI and PI may be based on at least one of: a scheduled entity interference graph or a scheduled entity resource schedule.

FIG. 10 is a schematic illustration of another example of a wireless communication system 1000 according to some aspects of the present disclosure. The wireless communication system 1000 includes a scheduling entity 1002, such as the scheduling entity 500 of FIG. 5, or a network access node or a gNB of any of FIG. 1, 2, or 3. The scheduling entity 1002 schedules sidelink communications (e.g., sidelink data). The sidelink data may be normal priority (e.g., eMBB data) or high priority (e.g., URLLC data). The sidelink data may be assigned a priority ranking (e.g., a rank value from 0 to 7). As in the example of mode 1 sidelink operation, the scheduling entity 1002 may allocate sidelink resources for sidelink communications. According to some examples, a scheduling entity 1002 allocates the frequency and time resources for sidelink communications in the same space (the same frequency and time resource) that would otherwise be used for uplink transmissions from user equipment (e.g., scheduled entities 1004, 1006, 1008, 1010, 1012) to the scheduling entity 1002. The scheduled entities 1004, 1006, 1008, 1010, 1012 are all scheduled entities scheduled to transmit or receive in the sidelink resource and may be referred to as a sidelink network 1022.

In the schematic illustration of FIG. 10, a high priority URLLC sidelink data (e.g., first data) needs to be sent from a first scheduled entity 1012 to a second scheduled entity 1004. The high priority URLLC sidelink data, or first data, is represented by a transmit radiation lobe 1018 emanating from first scheduled entity 1012. In some examples, the first data may need to be scheduled during the sidelink resource allocated for sidelink communications. Similar to the third scenario previously described, the high priority URLLC sidelink data, or first data, may preempt uplink data (e.g., first UL data). The first UL data is represented by a transmit radiation lobe 1020 emanating from a third scheduled entity 1010. In accordance with one aspect, the scheduling entity 1002 obtains a first priority ranking of the first data and a second priority ranking of the first UL data (e.g., uplink data represented by the transmit radiation lobe 1020) scheduled for transmission from the third scheduled entity 1010 to the scheduling entity 1002 using at least a portion of a sidelink resource reserved for uplink communication.

The first scheduled entity 1012 may transmit to the scheduling entity 1002 some indication of the ranking priority of the first data. Accordingly, the scheduling entity 1002 may obtain (e.g., receive from the first scheduled entity 1012) at least one of: a scheduling request (SR) or a buffer status report (BSR) 1024 from the first scheduled entity 1012. The SR and/or BSR may indicate the ranking priority of the first data. The scheduling entity 1002 knows the ranking priority of the uplink first UL data (represented by transmit radiation lobe 1020) (e.g., eMBB, non-URLLC, or low priority data) because the scheduling entity 1002 scheduled the first UL data. Based on the ranking priorities, the scheduling entity 1002 schedules the first data and may send a transmission cancellation indication (CI) 1026 to the third scheduled entity 1010. The transmission cancellation indication may act to cancel transmission of the first UL data. The transmission cancellation indication may be sent, for example, if the first data transmission will collide with the first UL data transmission in at least one of: frequency or time. The CI 1026 may stop the transmission of the first UL data and prevent interference, at the second scheduled entity 1004, with the first data. In another example, a preemption indication (PI) may be sent to a receiving scheduled entity. The PI may be sent from the scheduling entity 1002 or the first scheduled entity 1012. CI and PI may be based on at least one of: a scheduled entity interference graph or a scheduled entity resource schedule.

Figure 11:
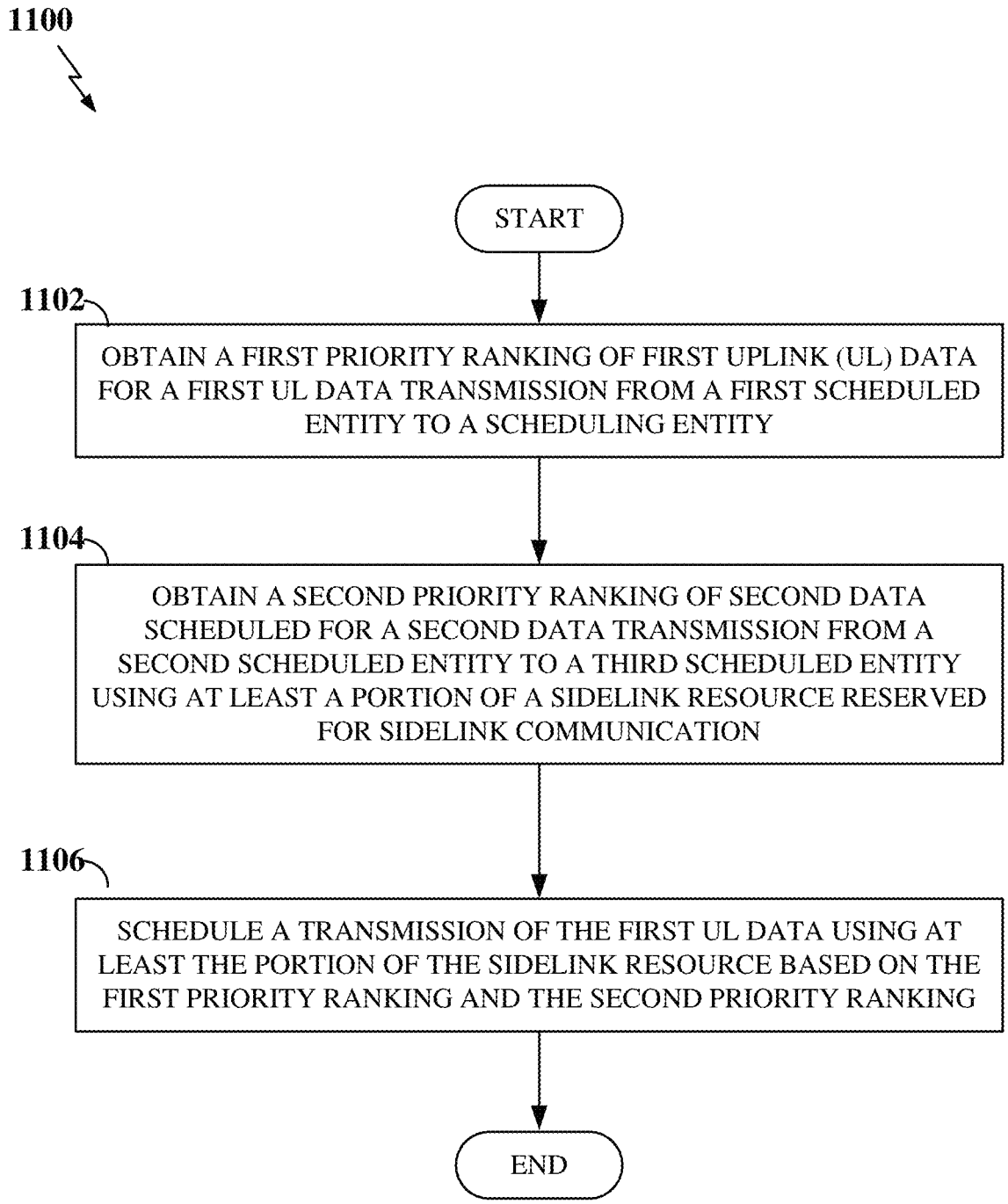
FIG. 11 is a flow chart illustrating an exemplary method of wireless communication at a scheduling entity in a wireless communication network according to some aspects of the present disclosure.

FIG. 11 is a flow chart illustrating an exemplary method 1100 (e.g., a process) of wireless communication at a scheduling entity in a wireless communication network according to some aspects of the present disclosure. As described below, some or all illustrated features may be omitted in a particular implementation within the scope of the present disclosure, and some illustrated features may not be required for implementation of all examples. In some examples, the method 1100 may be carried out by the scheduling entity 500 illustrated in FIG. 5 or any scheduling entity 702, 802, 902, 1002 in FIGS. 7-10, respectively. In some examples, the method 1100 may be carried out by any suitable apparatus or means for carrying out the functions or algorithm described below.

At block 1102, the scheduling entity may obtain a first priority ranking of first uplink (UL) data for a first UL transmission from a first scheduled entity to the scheduling entity. At block 1104, the scheduling entity may obtain a second priority ranking of second data scheduled for a second data transmission from a second scheduled entity to a third scheduled entity using at least a portion of a sidelink resource reserved for sidelink communication. At block 1106, the scheduling entity may schedule a transmission of the first UL data using at least the portion of the sidelink resource based on the first priority ranking and the second priority ranking. For example, at block 1106, the scheduling entity may schedule the transmission of the first UL data using at least the portion of the sidelink resource if the first priority ranking represents a greater priority than the second priority ranking.

According to some aspects, the method 1100 may further include obtaining at least one of: the first priority ranking, or the second priority ranking in at least one of: a scheduling request (SR), or a buffer status report (BSR) received from the first scheduled entity or the second scheduled entity, respectively. The SR and/or BSR may be received at the scheduling entity from the first scheduled entity.

Figure 12:
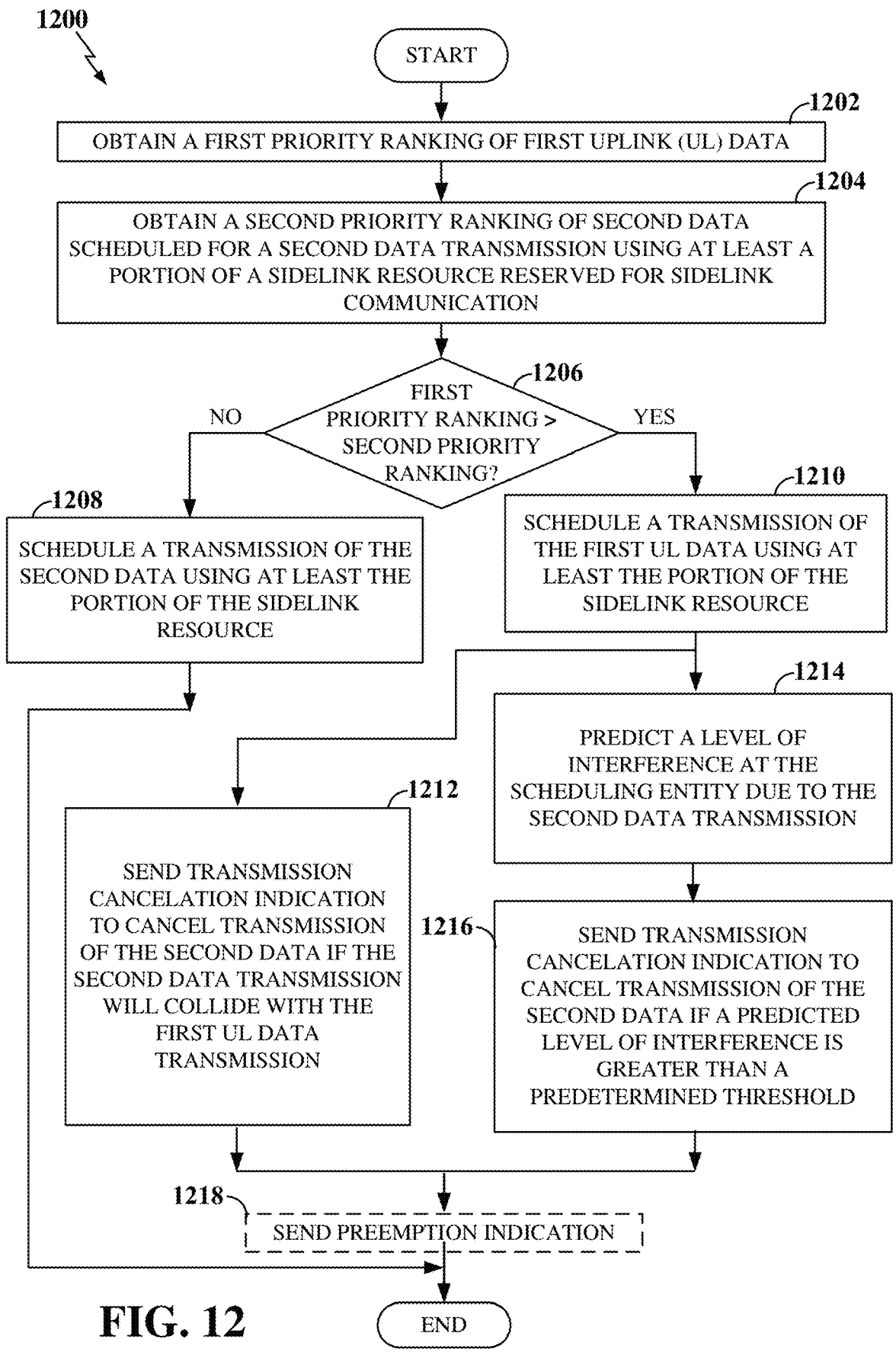
FIG. 12 is a flow chart illustrating another exemplary method of wireless communication at a scheduling entity in a wireless communication network according to some aspects of the present disclosure.

FIG. 12 is a flow chart illustrating another exemplary method 1200 (e.g., a process) of wireless communication at a scheduling entity in a wireless communication network according to some aspects of the present disclosure. As described below, some or all illustrated features may be omitted in a particular implementation within the scope of the present disclosure, and some illustrated features may not be required for implementation of all examples. In some examples, the method 1200 may be carried out by the scheduling entity 500 illustrated in FIG. 5 or any scheduling entity 702, 802, 902, 1002 in FIGS. 7-10, respectively. In some examples, the method 1200 may be carried out by any suitable apparatus or means for carrying out the functions or algorithm described below.

At block 1202, the scheduling entity may obtain a first priority ranking of first uplink (UL) data for a first UL data transmission from a first scheduled entity to the scheduling entity. At block 1204, the scheduling entity may obtain a second priority ranking of second data scheduled for a second data transmission (from a second scheduled entity to a third scheduled entity) using at least a portion of a sidelink resource reserved for sidelink communication. At block 1206, a determination may be made as to whether the first priority ranking represents a greater priority than the second priority ranking.

If the first priority ranking does not represent a greater priority than the second priority ranking, the scheduling entity may schedule transmission of the second data using at least the portion of the sidelink resource at block 1208. Following block 1208, the method 1200 may end.

Returning to block 1206, if the first priority ranking represents a greater priority than the second priority ranking, the scheduling entity may schedule a transmission of the first UL data using at least the portion of the sidelink resource at block 1210.

At block 1212, following, or simultaneously with, or nearly simultaneously with the scheduling of the transmission of the first UL data, the scheduling entity may send a transmission cancellation indication to cancel transmission of the second data, if the second data transmission will collide with the first UL data transmission in at least one of: frequency or time. At block 1214, alternatively, or additionally, the scheduling entity may predict a level of interference at the scheduling entity due to the second data transmission (of the second data from the second scheduled entity). Thereafter, at block 1216 the scheduling entity may send a transmission cancellation indication to cancel the second data transmission (of the second data) if the predicted level of interference is greater than a predetermined threshold. Canceling transmission of the second data may improve a signal-to-interference ratio of the first UL data received at the second scheduled entity.

According to some aspects, predicting the level of interference may be accomplished using, for example, at least one of: a sidelink interference graph, a transmit beam of the second scheduled entity (e.g., information about the transmit beam, including, for example, direction or relative direction), or a receive beam for the first UL data of the scheduling entity (e.g., information about the receive beam, including, for example, direction or relative direction).

According to some aspects, the method 1200 may further include sending the transmission cancellation indication to at least one of: at least the second scheduled entity, scheduled entities including the second scheduled entity scheduled to transmit in at least the portion of the sidelink resource, or a portion of the scheduled entities including the second scheduled entity scheduled to transmit in at least the portion of the sidelink resource that will cause interference with reception of the UL data.

According to some aspects, the method 1200 may optionally include, at block 1218, sending a preemption indication to indicate that a receiving scheduled entity (e.g., the third scheduled entity) is to ignore data (e.g., a signal) received during at least the portion of the sidelink resource, or, for example, sending a preemption indication to indicate that receiving scheduled entities (including the third scheduled entity) are to ignore data including the second data received during at least the portion of the sidelink resource. In some examples, the preemption indication may be sent to at least one of: at least the third scheduled entity, scheduled entities including the third scheduled entity scheduled to receive in at least the portion of the sidelink resource, or a portion of the scheduled entities including the third scheduled entity scheduled to receive in at least the portion of the sidelink resource that may receive interference from the transmission of the UL data.

In some aspects, the method 1200 further includes instructing (e.g., causing) the second scheduled entity to send a preemption indication to indicate that a receiving scheduled entity (e.g., the third scheduled entity) is to ignore (e.g., disregard) data received during at least the portion of the sidelink resource, or, for example, sending a preemption indication to indicate that receiving scheduled entities including the third scheduled entity are to ignore data including the second data received during at least the portion of the sidelink resource. According to some aspects, the second scheduled entity may send the preemption indication without being instructed to do so by the scheduling entity. According to other aspects, the scheduling entity may instruct the second scheduled entity to send the preemption indication to at least one of: at least the third scheduled entity, scheduled entities including the third scheduled entity scheduled to receive in at least the portion of the sidelink resource, or a portion of the scheduled entities including the third scheduled entity scheduled to receive in at least the portion of the sidelink resource that may receive interference from the transmission of the UL data.

In one aspect, the scheduling entity may send a transmission cancellation indication to cancel a transmission of the second data: in response to a first determination that the second data transmission (of the second data) will interfere with the first UL data transmission (of the first UL data) in frequency, time, or both; or in response to a second determination that a predicted level of interference received at the scheduling entity due to the second data transmission is greater than a predetermined threshold.

According to another aspect, an exemplary method of wireless communication at a scheduling entity, in accordance with some aspects of the present disclosure, may include obtaining a first priority ranking of first uplink (UL) data for a first UL data transmission from a first scheduled entity to the scheduling entity, obtaining a second priority ranking of second data scheduled for a second data transmission from a second scheduled entity to a third scheduled entity using at least a portion of a sidelink resource reserved for sidelink communication, and scheduling a first UL data transmission of the first UL data based on the first priority ranking and the second priority ranking. For example, the scheduling entity may schedule the first UL data transmission of the first UL data using at least the portion of the sidelink resource if the first priority ranking represents a greater priority than the second priority ranking.

According to some aspects, the method may further include obtaining the second priority ranking based on at least one of: a scheduling request (SR), or a buffer status report (BSR) received from the second scheduled entity. Additionally or alternatively, the method may further include sending a transmission cancellation indication to cancel the second data transmission (of the second data): in response to a first determination that the second data transmission will interfere with the first UL data transmission (of the first UL data) in frequency, time, or both; or in response to a second determination that a predicted level of interference received at the scheduling entity due to the second data transmission is greater than a predetermined threshold. According to one aspect, the scheduling entity may predict the level of interference using: a sidelink interference graph, a transmit beam of the second scheduled entity, a receive beam for the first UL data of the scheduling entity, or some combination thereof. According to one example, the scheduling entity may send the transmission cancellation indication to at least one of: at least the second scheduled entity, scheduled entities including the second scheduled entity scheduled to transmit in at least the portion of the sidelink resource, or a portion of the scheduled entities including the second scheduled entity scheduled to transmit in at least the portion of the sidelink resource that will cause interference with reception of the UL data.

The method may further include sending a preemption indication to indicate that a receiving scheduled entity is to ignore data (e.g., a signal) received during the sidelink resource. In one example, the scheduling entity may send the preemption indication to at least one of: at least the third scheduled entity, scheduled entities including the third scheduled entity scheduled to receive in the sidelink resource, or a portion of the scheduled entities including the third scheduled entity scheduled to receive in the sidelink resource that will receive interference from the transmission of the first UL data.

According to still another aspect, the method may include instructing (e.g., causing) the second scheduled entity to send a preemption indication to indicate that a receiving scheduled entity is to ignore data (e.g., a signal) received during the sidelink resource. In one example, the scheduling entity may instruct the second scheduled entity to send the preemption indication to at least one of: at least the third scheduled entity, scheduled entities including the third scheduled entity scheduled to receive in the sidelink resource, or a portion of the scheduled entities including the third scheduled entity scheduled to receive in the sidelink resource that will receive interference from the transmission of the first UL data.

Figure 13:
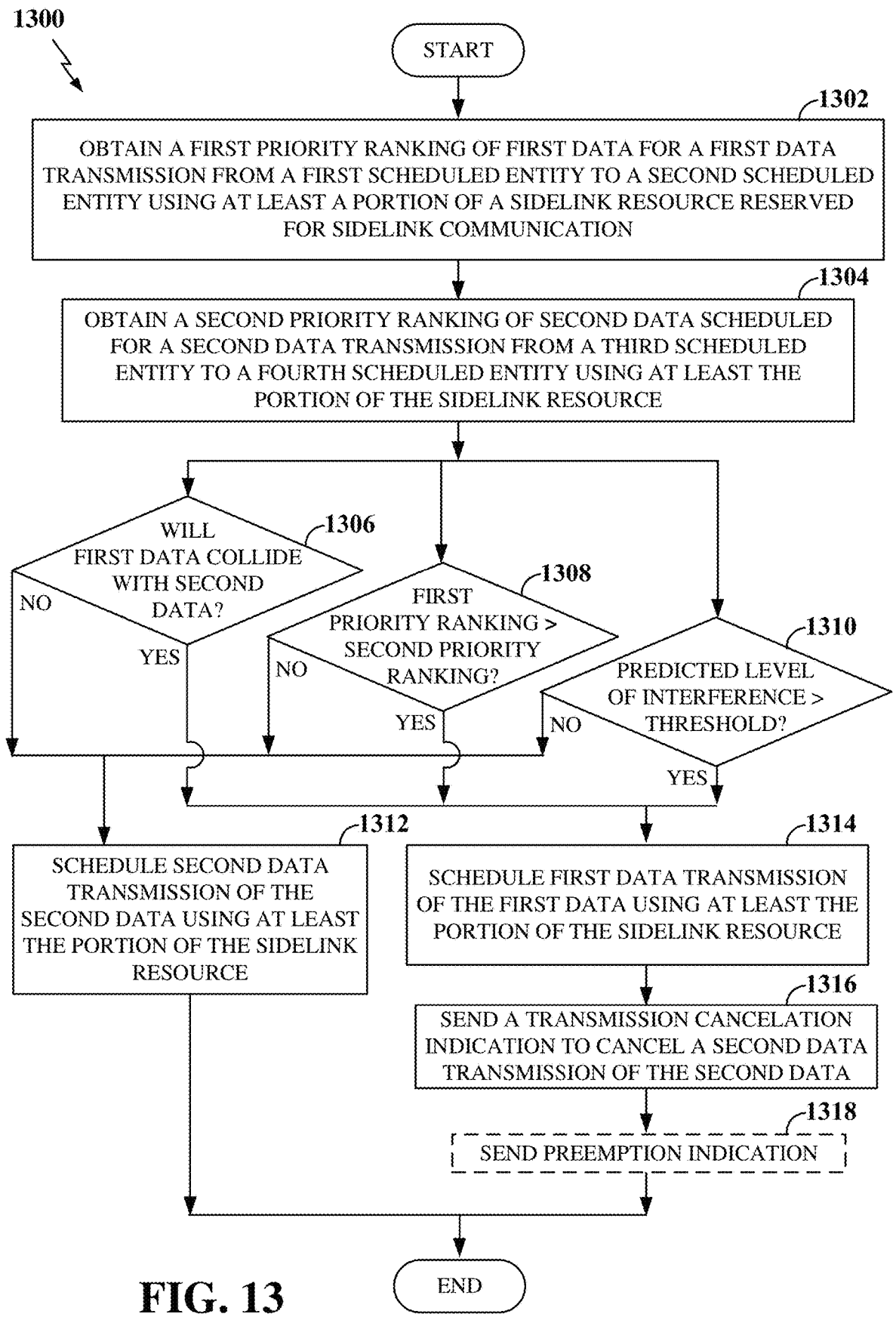
FIG. 13 is a flow chart illustrating another exemplary method of wireless communication at a scheduling entity in a wireless communication network according to some aspects of the present disclosure.

FIG. 13 is a flow chart illustrating another exemplary method 1300 (e.g., a process) of wireless communication at a scheduling entity in a wireless communication network according to some aspects of the present disclosure. As described below, some or all illustrated features may be omitted in a particular implementation within the scope of the present disclosure, and some illustrated features may not be required for implementation of all examples. In some examples, the method 1300 may be carried out by the scheduling entity 500 illustrated in FIG. 5 or any scheduling entity 702, 802, 902, 1002 in FIGS. 7-10, respectively. In some examples, the method 1300 may be carried out by any suitable apparatus or means for carrying out the functions or algorithm described below.

At block 1302, the scheduling entity may obtain a first priority ranking of first data for a first data transmission from a first scheduled entity to a second scheduled entity using at least a portion of a sidelink resource reserved for sidelink communication. At block 1304, the scheduling entity may obtain a second priority ranking of second data scheduled for a second data transmission from a third scheduled entity to a fourth scheduled entity using at least the portion of the sidelink resource. Scheduling a first data transmission of the first data using at least the portion of the sidelink resource may occur based on the first priority ranking and the second priority ranking. According to some aspects, scheduling a first data transmission of the first data using at least the portion of the sidelink resource may occur at block 1314 if the first priority ranking represents a greater priority than the second priority ranking at block 1308, or if the first data transmission will collide with the second data transmission (e.g., in at least one of: frequency or time) at block 1306, or if a predicted level of interference at the second scheduled entity from the second data transmission (of the second data from the third scheduled entity) is greater than a predetermined threshold at block 1310. Thereafter, if the scheduling entity determines to schedule the first data transmission, the scheduling entity may send a transmission cancellation indication to cancel a second data transmission of the second data at block 1316. In some aspects, the scheduling entity may send the transmission cancellation to cancel the second data transmission if the scheduling entity is scheduling the first data transmission.

However, if the first priority ranking does not represent a greater priority than the second priority ranking at block 1308, or if the first data transmission will not collide with the second data transmission in at least one of: frequency or time at block 1306, or if a predicted level of interference at the second scheduled entity from the second data transmission (of the second data from the third scheduled entity) is not greater than a predetermined threshold at block 1310, then the scheduling entity may schedule the second data transmission of the second data using at least the portion of the sidelink resource at block 1312.

According to some aspects, the method 1300 may further include at least one of: obtaining the first priority ranking in at least one of: a first scheduling request (SR) or a first buffer status report (BSR) received from the first scheduled entity, or obtaining the second priority ranking in at least one of: a second scheduling request (SR) or a second buffer status report (BSR) received from the third scheduled entity.

According to some other aspects, the method 1300 may further include predicting the level of interference using at least one of: a sidelink interference graph, a sidelink schedule, a transmit beam transmitting the second data from the third scheduled entity to the fourth scheduled entity (e.g., information about the transmit beam including, for example, a direction or relative direction of the beam), or a receive beam receiving the first data from the first scheduled entity at the second scheduled entity (e.g., information about the receive beam including, for example, a direction or relative direction of the beam).

In still other aspects, the method 1300 may further include sending the transmission cancellation indication to at least one of: at least the third scheduled entity, scheduled entities including the third schedule entity scheduled to transmit in at least the portion of the sidelink resource, or a portion of the scheduled entities including the third schedule entity scheduled to transmit in at least the portion of the sidelink resource that will cause interference with a reception of the first data at the second scheduled entity.

Following block 1316, the scheduling entity may send a preemption indication to indicate that a receiving scheduled entity (e.g., the fourth scheduled entity) is to ignore (e.g., disregard, not decode) data including the second data received during at least the portion of the sidelink resource at block 1318. According to some aspects, sending the preemption indication includes sending the preemption indication to at least one of: at least the fourth scheduled entity, scheduled entities including the fourth scheduled entity scheduled to receive in at least the portion of the sidelink resource, or a portion of the scheduled entities including the fourth scheduled entity scheduled to receive in at least the portion of the sidelink resource that will receive interference from the transmission of the first data.

According to some aspects, the scheduling entity may further act by instructing (e.g., causing) the third scheduled entity to send a preemption indication to indicate that a receiving scheduled entity (e.g., the fourth scheduled entity) is to ignore data including the second data received during at least the portion of the sidelink resource. According to some aspects, the third scheduled entity may send the preemption indication without being instructed to do so by the scheduling entity. In some examples, the scheduling entity may instruct the third scheduled entity to send the preemption indication to at least one of: a least the fourth scheduled entity, scheduled entities including the fourth scheduled entity scheduled to receive in at least the portion of the sidelink resource, or a portion of the scheduled entities including the fourth scheduled entity receiving in at least the portion of the sidelink resource that will receive interference from the transmission of the first data transmission.

Figure 14:
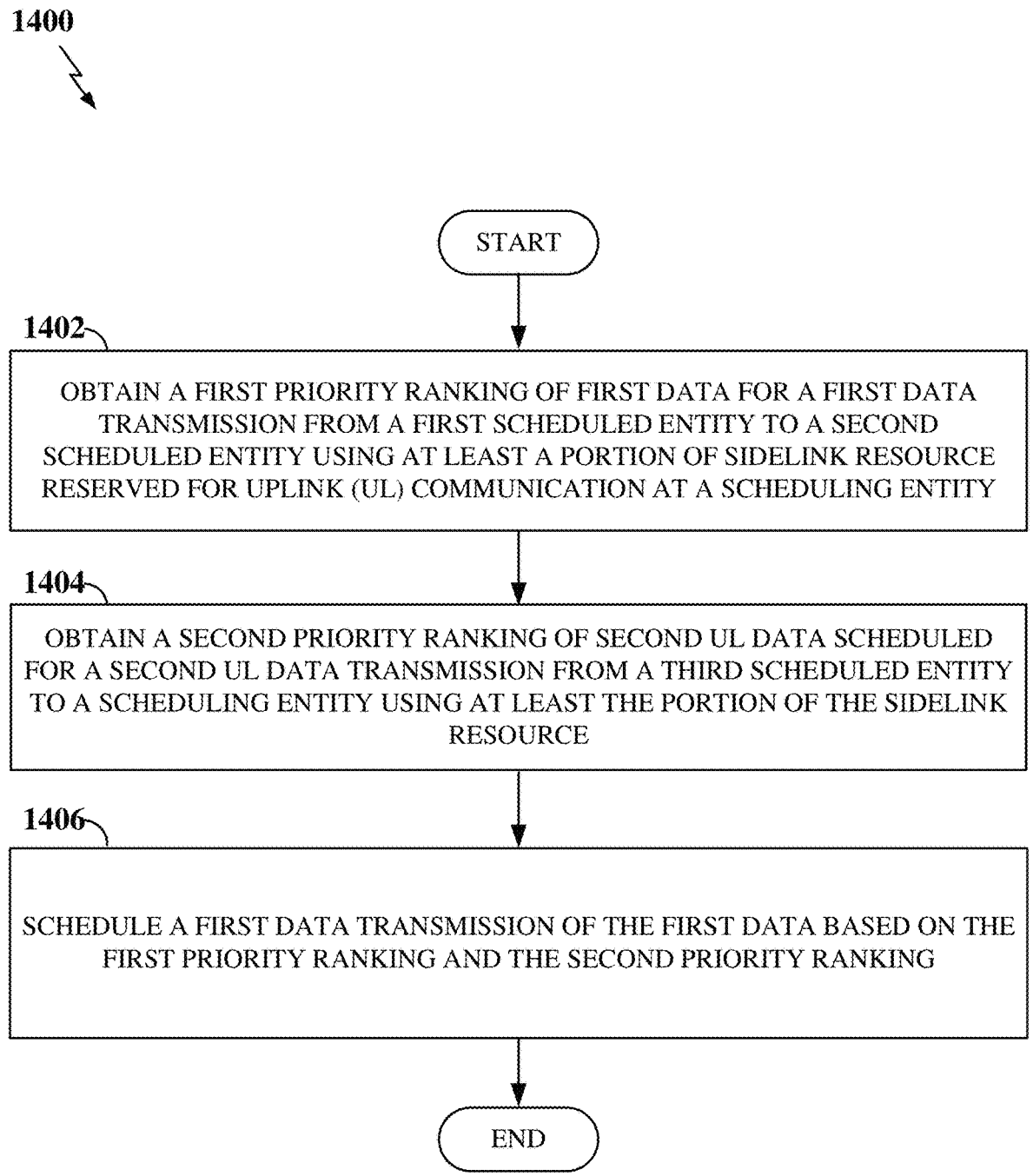
FIG. 14 is a flow chart illustrating another exemplary method of wireless communication at a scheduling entity in a wireless communication network according to some aspects of the present disclosure.

FIG. 14 is a flow chart illustrating another exemplary method 1400 (e.g., a process) of wireless communication at a scheduling entity in a wireless communication network according to some aspects of the present disclosure. As described below, some or all illustrated features may be omitted in a particular implementation within the scope of the present disclosure, and some illustrated features may not be required for implementation of all examples. In some examples, the method 1400 may be carried out by the scheduling entity 500 illustrated in FIG. 5 or any scheduling entity 702, 802, 902, 1002 in FIGS. 7-10, respectively. In some examples, the method 1400 may be carried out by any suitable apparatus or means for carrying out the functions or algorithm described below.

At block 1402, the scheduling entity may obtain a first priority ranking of first data for a first data transmission from a first scheduled entity to a second scheduled entity using at least a portion of a sidelink resource reserved for uplink (UL) communication at the scheduling entity. The scheduling entity may also obtain a second priority ranking of second UL data scheduled for a second UL data transmission from a third scheduled entity to a scheduling entity using at least the portion of the sidelink resource at block 1404. The scheduling entity may further schedule a first data transmission of the first data based on the first priority ranking and the second priority ranking at block 1406. For example, the scheduling entity may schedule the first data transmission of the first data using at least the portion of the sidelink resource if the first priority ranking represents a greater priority than the second priority ranking.

According to some aspects, the method further includes obtaining the first priority ranking in at least one of: a scheduling request (SR) or a buffer status report (BSR) received from the first scheduled entity.

Figure 15:
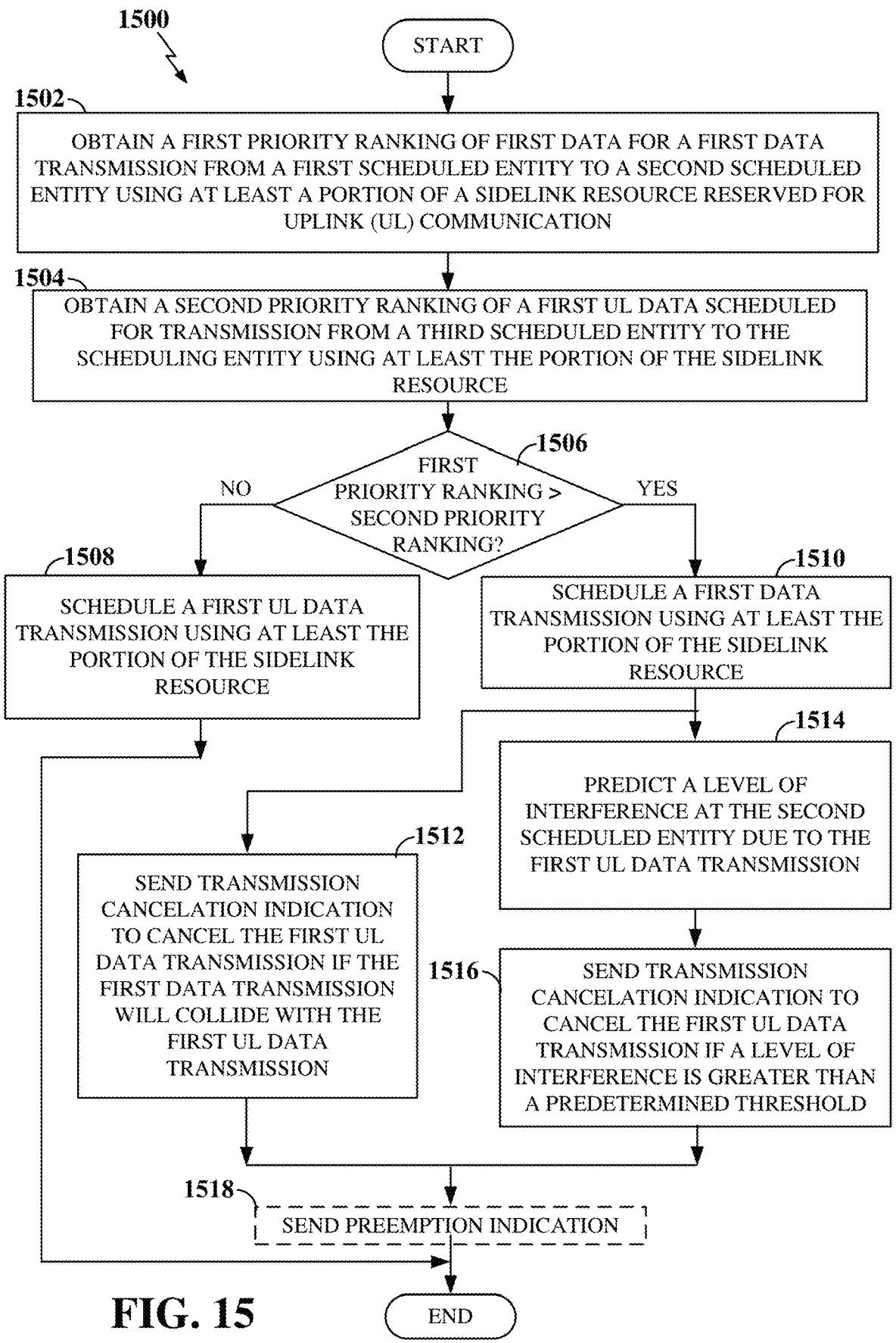
FIG. 15 is a flow chart illustrating another exemplary method of wireless communication at a scheduling entity in a wireless communication network according to some aspects of the present disclosure.

FIG. 15 is a flow chart illustrating another exemplary method 1500 (e.g., a process) of wireless communication at a scheduling entity in a wireless communication network according to some aspects of the present disclosure. As described below, some or all illustrated features may be omitted in a particular implementation within the scope of the present disclosure, and some illustrated features may not be required for implementation of all examples. In some examples, the method 1400 may be carried out by the scheduling entity 500 illustrated in FIG. 5 or any scheduling entity 702, 802, 902, 1002 in FIGS. 7-10, respectively. In some examples, the method 1500 may be carried out by any suitable apparatus or means for carrying out the functions or algorithm described below.

At block 1502, the scheduling entity may obtain a first priority ranking of first data for a first data transmission from a first scheduled entity to a second scheduled entity using at least a portion of a sidelink resource reserved for uplink (UL) communication. The sidelink resource reserved for UL communication may be reserved for scheduled entity to scheduling entity UL communication. The scheduling entity may also obtain a second priority ranking of a first UL data scheduled for transmission from a third scheduled entity to the scheduling entity using at least the portion of the sidelink resource at block 1504. Scheduling may be based on the first priority ranking and the second priority ranking. For example, at block 1506, a determination may be made as to whether the first priority ranking represents a greater priority than the second priority ranking.

If the first priority ranking does not represent a greater priority than the second priority ranking, the scheduling entity may schedule a first UL data transmission (of the first UL data) using at least the portion of the sidelink resource at block 1508. Returning to block 1506, if the first priority ranking does represent a greater priority than the second priority ranking, the scheduling entity may schedule a first data transmission of the first data using at least the portion of the sidelink resource at block 1510. Following the scheduling of the transmission of the first data using the sidelink resource at block 1510, the scheduling entity may send a transmission cancellation indication to cancel the first UL data transmission (of the first UL data) if the first data transmission will collide with the first UL data transmission in at least one of: frequency or time at block 1512. Additionally or alternatively, the scheduling entity may predict a level of interference at the second scheduled entity due to the first UL data transmission (of the first UL data from the third scheduled entity) at block 1514 and send a transmission cancellation indication to cancel the first UL data transmission (of the first UL data) if the predicted level of interference is greater than a predetermined threshold, to improve a signal-to-interference ratio of the first data received at the second scheduled entity at block 1516.

According to some aspects, predicting the level of interference may be accomplished with using at least one of: a sidelink interference graph, or a transmit beam for the first UL data for the first UL data transmission from the third scheduled entity to the scheduling entity (e.g., information about the beam, including, for example, a direction or relative direction), or a receive beam for the first data for the first data transmission from the first scheduled entity to the second scheduled entity (e.g., information about the beam, including, for example, a direction or relative direction).

According to some aspects, a transmission cancellation indication to cancel transmission of the first UL data may be sent to at least one of: at least the third scheduled entity, scheduled entities including the third scheduled entity scheduled to transmit in the sidelink resource, or a portion of the scheduled entities including the third scheduled entity scheduled to transmit in the sidelink resource that will cause interference with a reception of the first data at the second scheduled entity.

Figure 16:
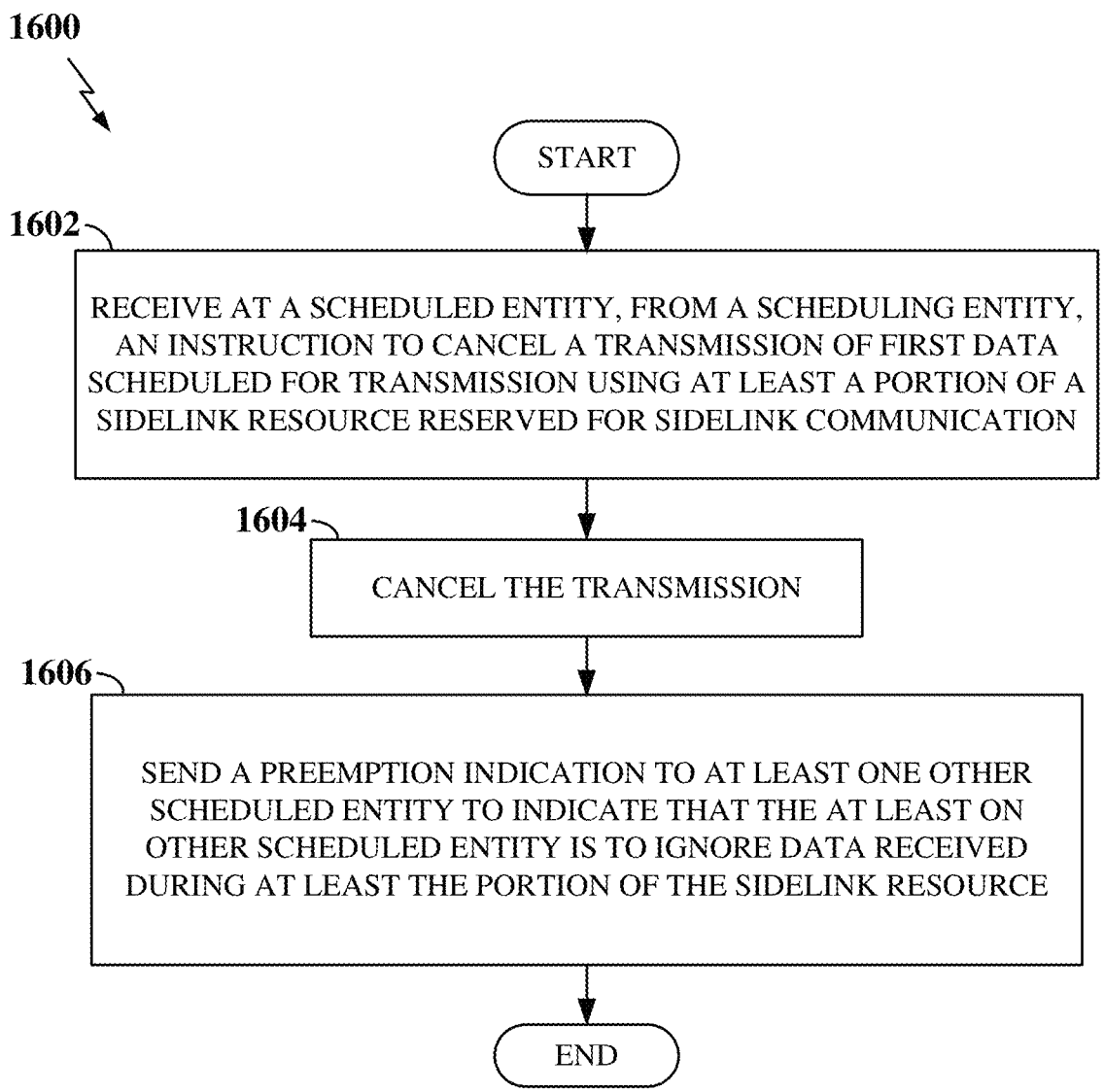
FIG. 16 is a flow chart illustrating an exemplary method of wireless communication at a first scheduled entity in a wireless communication network of a plurality of scheduled entities according to some aspects of the present disclosure.

FIG. 16 is a flow chart illustrating an exemplary method 1600 (e.g., a process) of wireless communication at a first scheduled entity of a plurality of scheduled entities according to some aspects of the present disclosure. As described below, some or all illustrated features may be omitted in a particular implementation within the scope of the present disclosure, and some illustrated features may not be required for implementation of all examples. In some examples, the method 1500 may be carried out by the scheduled entity 600 illustrated in FIG. 6 or any scheduled entity 704, 706, 708, 710, 712 of FIG. 7, 804, 806, 808, 810, 812 of FIG. 8, 904, 906, 908, 910, 912 of FIG. 9, or 1004, 1006, 1008, 1010, 1012 of FIG. 10. In some examples, the method 1600 may be carried out by any suitable apparatus or means for carrying out the functions or algorithm described below.

At block 1602, a first scheduled entity of a plurality of scheduled entities may receive, from a scheduling entity, an instruction to cancel a transmission of first data scheduled for transmission using at least a portion of a sidelink resource reserved for sidelink communication. The first scheduled entity may cancel the transmission in accordance with the received instruction at block 1604. The first scheduled entity may send a preemption indication to at least one other of the plurality of scheduled entities to indicate that the at least one other of the plurality of scheduled entities is to ignore data (e.g., a signal) received during at least the portion of the sidelink resource at block 1606.

According to some aspects, the scheduled entity may send a preemption indication to at least one of: a unique one of the plurality of scheduled entities; scheduled entities scheduled to receive data during the sidelink resource; or a portion of the scheduled entities scheduled to receive data during the sidelink resource that will receive interference from a transmission of first UL data during the sidelink resource.

In one aspect, a scheduling entity (e.g., scheduling entity 500 of FIG. 5) for wireless communication in a wireless communication network includes means for obtaining a first priority ranking of first uplink (UL) data for a first UL data transmission from a first scheduled entity to the scheduling entity, means for obtaining a second priority ranking of second data scheduled for a second data transmission from a second scheduled entity to a third scheduled entity using at least a portion of a sidelink resource reserved for sidelink communication, and means for scheduling a first UL data transmission of the first UL data using at least the portion of the sidelink resource based on the first priority ranking and the second priority ranking. For example, the means for scheduling the first UL data transmission of the first UL data using at least the portion of the sidelink resource if the first priority ranking represents a greater priority than the second priority ranking.

In another aspect, the scheduling entity for wireless communication in a wireless communication network includes means for obtaining a first priority ranking of first data for a first data transmission from a first scheduled entity to a second scheduled entity using at least a portion of a sidelink resource reserved for sidelink communication, means for obtaining a second priority ranking of second data scheduled for a second data transmission from a third scheduled entity to a fourth scheduled entity using at least the portion of the sidelink resource, means for scheduling the first data transmission using at least the portion of the sidelink resource if: the first priority ranking represents a greater priority than the second priority ranking, the first data transmission will collide with the second data transmission (e.g., in at least one of: frequency or time), or a predicted level of interference at the second scheduled entity from transmission of the second data from the third scheduled entity is greater than a predetermined threshold, and means for sending a transmission cancellation indication to cancel a transmission of the second data.

In still another aspect, a scheduled entity (e.g., scheduled entity 600 of FIG. 6) for wireless communication in a wireless communication network includes means for receiving, from a scheduling entity, an instruction to cancel a transmission of first data scheduled for transmission using at least a portion of a sidelink resource reserved for sidelink communication, means for canceling the transmission in accordance with the received instructions, and means for sending a preemption indication to at least one other of a plurality of scheduled entities to indicate that the at least one other of the plurality of scheduled entities is to ignore data (e.g., a signal) received during at least the portion of the sidelink resource in light of canceling the transmission.

In any of the aspects described above, the aforementioned means may be the processor 504 and/or the processor 604 shown in FIG. 5 and FIG. 6, respectively, configured to perform the functions recited by the aforementioned means. Additionally or alternatively, in any of the aspects described above, the aforementioned means may be a circuit, or any apparatus configured to perform the functions recited by the aforementioned means.

Of course, in the above examples, the circuitry included in the processor 504 and in the processor 604 are merely provided as an example, and other means for carrying out the described functions may be included within various aspects of the present disclosure, including but not limited to the instructions stored in the computer-readable storage medium 510 or in the computer-readable storage medium 610, or any other suitable apparatus or means described in any one of the FIGS. 1, 2, 3, and 5-10 and utilizing, for example, the methods, processes, and/or algorithms described herein in relation to FIGS. 11-16.

The following provides an overview of the present disclosure:

Aspect 1: A method of wireless communication at a scheduling entity in a wireless communication network, comprising: obtaining a first priority ranking of first uplink (UL) data for a first UL data transmission from a first scheduled entity to the scheduling entity; obtaining a second priority ranking of second data scheduled for a second data transmission from a second scheduled entity to a third scheduled entity using at least a portion of a sidelink resource reserved for sidelink communication; and scheduling the first UL data transmission using at least the portion of the sidelink resource based on the first priority ranking and the second priority ranking.

Aspect 2: The method of aspect 1, further comprising: scheduling the first UL data transmission using at least the portion of the sidelink resource if the first priority ranking represents a greater priority than the second priority ranking; and sending a transmission cancellation indication to cancel the second data transmission if the second data transmission will collide with the first UL data transmission.

Aspect 3: The method of aspects 1 or 2, further comprising: predicting a level of interference received at the scheduling entity due to the second data transmission; and sending a transmission cancellation indication to cancel the second data transmission if the predicted level of interference is greater than a predetermined threshold.

Aspect 4: The method of aspect 3, further comprising: sending the transmission cancellation indication to at least one of: at least the second scheduled entity, scheduled entities including the second scheduled entity scheduled to transmit in at least the portion of the sidelink resource, or a portion of the scheduled entities including the second scheduled entity scheduled to transmit in at least the portion of the sidelink resource that will cause interference with reception of the first UL data.

Aspect 5: The method of any of aspects 1 through 4, further comprising: sending a preemption indication to indicate that receiving scheduled entities including the third scheduled entity are to ignore data including the second data received during at least the portion of the sidelink resource.

Aspect 6: The method of any of aspects 1 through 5, further comprising: instructing the second scheduled entity to send a preemption indication to indicate that receiving scheduled entities including the third scheduled entity are to ignore data including the second data received during at least the portion of the sidelink resource.

Aspect 7: The method of any of aspects 1 through 6, further comprising: sending a transmission cancellation indication to cancel the second data transmission: in response to a first determination that the second data transmission will interfere with the first UL data transmission; or in response to a second determination that a predicted level of interference received at the scheduling entity due to the second data transmission is greater than a predetermined threshold.

Aspect 8: An apparatus configured as a scheduling entity for wireless communication in a wireless communication network, comprising: a processor; a transceiver communicatively coupled to the processor; and a memory communicatively coupled to the processor, wherein the processor is configured to: obtain a first priority ranking of first uplink (UL) data for a first UL data transmission from a first scheduled entity to the scheduling entity; obtain a second priority ranking of second data scheduled for a second data transmission from a second scheduled entity to a third scheduled entity using at least a portion of a sidelink resource reserved for sidelink communication; and schedule the first UL data transmission using at least the portion of the sidelink resource based on the first priority ranking and the second priority ranking.

Aspect 9: The apparatus of aspect 8, wherein the processor is further configured to: schedule the first UL data transmission using at least the portion of the sidelink resource if the first priority ranking represents a greater priority than the second priority ranking; and send a transmission cancellation indication to cancel the second data transmission if the second data transmission will collide with the first UL data transmission.

Aspect 10: The apparatus of aspects 8 or 9, wherein the processor is further configured to: predict a level of interference received at the scheduling entity due to the second data transmission; and send a transmission cancellation indication to cancel the second data transmission if the predicted level of interference is greater than a predetermined threshold.

Aspect 11: The apparatus of any of aspects 8 through 10, wherein the processor is further configured to: send the transmission cancellation indication to at least one of: at least the second scheduled entity, scheduled entities including the second scheduled entity scheduled to transmit in at least the portion of the sidelink resource, or a portion of the scheduled entities including the second scheduled entity scheduled to transmit in at least the portion of the sidelink resource that will cause interference with reception of the first UL data.

Aspect 12: The apparatus of any of aspects 8 through 11, wherein the processor is further configured to: send a preemption indication to indicate that receiving scheduled entities including the third scheduled entity are to ignore data including the second data received during at least the portion of the sidelink resource.

Aspect 13: The apparatus of any of aspects 8 through 12, wherein the processor is further configured to: instruct the second scheduled entity to send a preemption indication to indicate that receiving scheduled entities including the third scheduled entity are to ignore data including the second data received during at least the portion of the sidelink resource.

Aspect 14: The apparatus of any of aspects 8 through 13, wherein the processor is further configured to: send a transmission cancellation indication to cancel the second data transmission: in response to a first determination that the second data transmission will interfere with the first UL data transmission; or in response to a second determination that a predicted level of interference received at the scheduling entity due to the second data transmission is greater than a predetermined threshold.

Aspect 15: A method of wireless communication at a scheduling entity in a wireless communication network, comprising: obtaining a first priority ranking of first data for a first data transmission from a first scheduled entity to a second scheduled entity using at least a portion of a sidelink resource reserved for sidelink communication; obtaining a second priority ranking of second data scheduled for a second data transmission from a third scheduled entity to a fourth scheduled entity using at least the portion of the sidelink resource reserved for sidelink communication; and scheduling the first data transmission of the first data using at least the portion of the sidelink resource based on the first priority ranking and the second priority ranking.

Aspect 16: The method of aspect 15, further comprising sending a transmission cancellation indication to cancel the second data transmission if: the first priority ranking represents a greater priority than the second priority ranking, the first data transmission will collide with the second data transmission, or a predicted level of interference at the second scheduled entity from the second data transmission is greater than a predetermined threshold.

Aspect 17: The method of aspect 15 or 16, further comprising: sending the transmission cancellation indication to at least one of: at least the third scheduled entity, scheduled entities including the third scheduled entity scheduled to transmit in at least the portion of the sidelink resource, or a portion of the scheduled entities including the third scheduled entity scheduled to transmit in at least the portion of the sidelink resource that will cause interference with a reception of the first data.

Aspect 18: The method of any of aspects 15 through 17, further comprising: predicting the level of interference using at least one of: a sidelink interference graph, a sidelink schedule, a transmit beam transmitting the second data from the third scheduled entity to the fourth scheduled entity, or a receive beam receiving the first data from the first scheduled entity at the second scheduled entity.

Aspect 19: The method of any of aspects 15 through 18, further comprising: sending a preemption indication to indicate that receiving scheduled entities including the fourth scheduled entity are to ignore data including the second data received during at least the portion of the sidelink resource.

Aspect 20: The method of any of aspects 15 through 19, further comprising: sending the preemption indication to at least one of: at least the fourth scheduled entity, scheduled entities including the fourth scheduled entity scheduled to receive in at least the portion of the sidelink resource, or a portion of the scheduled entities including the fourth scheduled entity scheduled to receive in at least the portion of the sidelink resource that will receive interference from the first data transmission.

Aspect 21: The method of any of aspects 15 through 20, further comprising: instructing the third scheduled entity to send a preemption indication to indicate that receiving scheduled entities including the fourth scheduled entity are to ignore data including the second data received during at least the portion of the sidelink resource.

Aspect 22: The method of any of aspects 15 through 21, further comprising: instructing the third scheduled entity to send the preemption indication to at least one of: at least the fourth scheduled entity, scheduled entities including the fourth scheduled entity scheduled to receive in at least the portion of the sidelink resource, or a portion of the scheduled entities including the fourth scheduled entity scheduled to receive in at least the portion of the sidelink resource that will receive interference from the first data transmission.

Aspect 23: An apparatus configured as a scheduling entity for wireless communication in a wireless communication network, comprising: a processor; a transceiver communicatively coupled to the processor; and a memory communicatively coupled to the processor, wherein the processor is configured to: obtain a first priority ranking of first data for a first data transmission from a first scheduled entity to a second scheduled entity using at least a portion of a sidelink resource reserved for sidelink communication; obtain a second priority ranking of second data scheduled for a second data transmission from a third scheduled entity to a fourth scheduled entity using at least the portion of the sidelink resource reserved for sidelink communication; and schedule a first data transmission of the first data using at least the portion of the sidelink resource based on the first priority ranking and the second priority ranking.

Aspect 24: The apparatus of aspect 23, wherein the processor is further configured to: send a transmission cancellation indication to cancel the second data transmission if: the first priority ranking represents a greater priority than the second priority ranking, the first data transmission will collide with the second data transmission, or a predicted level of interference at the second scheduled entity from the second data transmission is greater than a predetermined threshold.

Aspect 25: The apparatus of aspect 23 or 24, wherein the processor is further configured to: send the transmission cancellation indication to at least one of: at least the third scheduled entity, scheduled entities including the third scheduled entity scheduled to transmit in at least the portion of the sidelink resource, or a portion of the scheduled entities including the third scheduled entity scheduled to transmit in at least the portion of the sidelink resource that will cause interference with a reception of the first data.

Aspect 26: The apparatus of any of aspects 23 through 25, wherein the processor is further configured to: predict the level of interference using at least one of: a sidelink interference graph, a sidelink schedule, a transmit beam transmitting the second data from the third scheduled entity to the fourth scheduled entity, or a receive beam receiving the first data from the first scheduled entity at the second scheduled entity.

Aspect 27: The apparatus of any of aspects 23 through 26, wherein the processor is further configured to: send a preemption indication to indicate that receiving scheduled entities including the fourth scheduled entity are to ignore data including the second data received during at least the portion of the sidelink resource.

Aspect 28: The apparatus of any of aspects 23 through 27, wherein the processor is further configured to: send the preemption indication to at least one of: at least the fourth scheduled entity, scheduled entities including the fourth scheduled entity scheduled to receive in at least the portion of the sidelink resource, or a portion of the scheduled entities including the fourth scheduled entity scheduled to receive in at least the portion of the sidelink resource that will receive interference from the first data transmission.

Aspect 29: The apparatus of any of aspects 23 through 28, wherein the processor is further configured to: instruct the third scheduled entity to send a preemption indication to indicate that receiving scheduled entities including the fourth scheduled entity are to ignore data including the second data received during at least the portion of the sidelink resource.

Aspect 30: The apparatus of any of aspects 23 through 29, wherein the processor is further configured to: instruct the third scheduled entity to send the preemption indication to at least one of: at least the fourth scheduled entity, scheduled entities including the fourth scheduled entity scheduled to receive in at least the portion of the sidelink resource, or a portion of the scheduled entities scheduled including the fourth scheduled entity scheduled to receive in at least the portion of the sidelink resource that will receive interference from the first data transmission.

Aspect 31: An apparatus configured as a scheduling entity for wireless communication in a wireless communication network at least one means for performing a method of any one of aspects 1 through 7 or 15 through 22.

Aspect 32: A non-transitory computer-readable medium storing computer-executable code, comprising code for causing an apparatus to perform a method of any one of aspects 1 through 7 or 15 through 22.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 3, and/or 5-10 may be configured to perform one or more of the methods, features, or steps described herein, including those associated with FIGS. 11-16. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects of the present disclosure. Various modifications to aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Similarly, the construct "A and/or B" may be understood as meaning A; B; or A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity in a wireless communication network, comprising:
   obtaining a first priority ranking of first uplink (UL) data for a first UL data transmission from a first scheduled entity to the scheduling entity;
   obtaining a second priority ranking of second data scheduled for a second data transmission from a second scheduled entity to a third scheduled entity using at least a portion of a sidelink resource reserved for sidelink communication,
      wherein the first scheduled entity, the second scheduled entity, and the third scheduled entity are different scheduled entities; and
   scheduling the first UL data transmission using at least the portion of the sidelink resource based on the first priority ranking and the second priority ranking.

2. The method of claim 1, further comprising:
   scheduling the first UL data transmission using at least the portion of the sidelink resource if the first priority ranking represents a greater priority than the second priority ranking; and
   sending a transmission cancellation indication to cancel the second data transmission if the second data transmission will collide with the first UL data transmission.

3. The method of claim 1, further comprising:
   predicting a level of interference received at the scheduling entity due to the second data transmission; and
   sending a transmission cancellation indication to cancel the second data transmission if the predicted level of interference is greater than a predetermined threshold.

4. The method of claim 3, further comprising:
   sending the transmission cancellation indication to at least one of:
      at least the second scheduled entity,
      scheduled entities including the second scheduled entity scheduled to transmit in at least the portion of the sidelink resource, or
      a portion of the scheduled entities including the second scheduled entity scheduled to transmit in at least the portion of the sidelink resource that will cause interference with reception of the first UL data.

5. The method of claim 1, further comprising:
   sending a preemption indication to indicate that receiving scheduled entities including the third scheduled entity are to ignore data including the second data received during at least the portion of the sidelink resource.

6. The method of claim 1, further comprising:
   instructing the second scheduled entity to send a preemption indication to indicate that receiving scheduled entities including the third scheduled entity are to ignore data including the second data received during at least the portion of the sidelink resource.

7. The method of claim 1, further comprising:
   sending a transmission cancellation indication to cancel the second data transmission:
      in response to a first determination that the second data transmission will interfere with the first UL data transmission; or
      in response to a second determination that a predicted level of interference received at the scheduling entity due to the second data transmission is greater than a predetermined threshold.

8. An apparatus configured as a scheduling entity for wireless communication in a wireless communication network, comprising:
   a processor;
   a transceiver communicatively coupled to the processor; and
   a memory communicatively coupled to the processor, wherein the processor is configured to:
obtain a first priority ranking of first uplink (UL) data for a first UL data transmission from a first scheduled entity to the scheduling entity;
obtain a second priority ranking of second data scheduled for a second data transmission from a second scheduled entity to a third scheduled entity using at least a portion of a sidelink resource reserved for sidelink communication,
wherein the first scheduled entity, the second scheduled entity, and the third scheduled entity are different scheduled entities; and
schedule the first UL data transmission using at least the portion of the sidelink resource based on the first priority ranking and the second priority ranking.

9. The apparatus of claim 8, wherein the processor is further configured to:
schedule the first UL data transmission using at least the portion of the sidelink resource if the first priority ranking represents a greater priority than the second priority ranking; and
send a transmission cancellation indication to cancel the second data transmission if the second data transmission will collide with the first UL data transmission.

10. The apparatus of claim 8, wherein the processor is further configured to:
predict a level of interference received at the scheduling entity due to the second data transmission; and
send a transmission cancellation indication to cancel the second data transmission if the predicted level of interference is greater than a predetermined threshold.

11. The apparatus of claim 10, wherein the processor is further configured to:
send the transmission cancellation indication to at least one of:
at least the second scheduled entity,
scheduled entities including the second scheduled entity scheduled to transmit in at least the portion of the sidelink resource, or
a portion of the scheduled entities including the second scheduled entity scheduled to transmit in at least the portion of the sidelink resource that will cause interference with reception of the first UL data.

12. The apparatus of claim 8, wherein the processor is further configured to:
send a preemption indication to indicate that receiving scheduled entities including the third scheduled entity are to ignore data including the second data received during at least the portion of the sidelink resource.

13. The apparatus of claim 8, wherein the processor is further configured to:
instruct the second scheduled entity to send a preemption indication to indicate that receiving scheduled entities including the third scheduled entity are to ignore data including the second data received during at least the portion of the sidelink resource.

14. The apparatus of claim 8, wherein the processor is further configured to:
send a transmission cancellation indication to cancel the second data transmission:
in response to a first determination that the second data transmission will interfere with the first UL data transmission; or
in response to a second determination that a predicted level of interference received at the scheduling entity due to the second data transmission is greater than a predetermined threshold.

15. A method of wireless communication at a scheduling entity in a wireless communication network, comprising:
obtaining a first priority ranking of first data for a first data transmission from a first scheduled entity to a second scheduled entity using at least a portion of a sidelink resource reserved for sidelink communication;
obtaining a second priority ranking of second data scheduled for a second data transmission from a third scheduled entity to a fourth scheduled entity using at least the portion of the sidelink resource reserved for sidelink communication; and
scheduling the first data transmission of the first data using at least the portion of the sidelink resource based on the first priority ranking and the second priority ranking.

16. The method of claim 15, further comprising sending a transmission cancellation indication to cancel the second data transmission if:
the first priority ranking represents a greater priority than the second priority ranking,
the first data transmission will collide with the second data transmission, or
a predicted level of interference at the second scheduled entity from the second data transmission is greater than a predetermined threshold.

17. The method of claim 16, further comprising:
sending the transmission cancellation indication to at least one of:
at least the third scheduled entity,
scheduled entities including the third scheduled entity scheduled to transmit in at least the portion of the sidelink resource, or
a portion of the scheduled entities including the third scheduled entity scheduled to transmit in at least the portion of the sidelink resource that will cause interference with a reception of the first data.

18. The method of claim 16, further comprising:
predicting the level of interference using at least one of:
a sidelink interference graph,
a sidelink schedule,
a transmit beam transmitting the second data from the third scheduled entity to the fourth scheduled entity, or
a receive beam receiving the first data from the first scheduled entity at the second scheduled entity.

19. The method of claim 15, further comprising:
sending a preemption indication to indicate that receiving scheduled entities including the fourth scheduled entity are to ignore data including the second data received during at least the portion of the sidelink resource.

20. The method of claim 19, further comprising:
sending the preemption indication to at least one of:
at least the fourth scheduled entity,
scheduled entities including the fourth scheduled entity scheduled to receive in at least the portion of the sidelink resource, or
a portion of the scheduled entities including the fourth scheduled entity scheduled to receive in at least the portion of the sidelink resource that will receive interference from the first data transmission.

21. The method of claim 15, further comprising:
instructing the third scheduled entity to send a preemption indication to indicate that receiving scheduled entities including the fourth scheduled entity are to ignore data including the second data received during at least the portion of the sidelink resource.

22. The method of claim 21, further comprising:
instructing the third scheduled entity to send the preemption indication to at least one of:
at least the fourth scheduled entity,
scheduled entities including the fourth scheduled entity scheduled to receive in at least the portion of the sidelink resource, or
a portion of the scheduled entities including the fourth scheduled entity scheduled to receive in at least the portion of the sidelink resource that will receive interference from the first data transmission.

23. An apparatus configured as a scheduling entity for wireless communication in a wireless communication network, comprising:
a processor;
a transceiver communicatively coupled to the processor; and
a memory communicatively coupled to the processor, wherein the processor is configured to:
obtain a first priority ranking of first data for a first data transmission from a first scheduled entity to a second scheduled entity using at least a portion of a sidelink resource reserved for sidelink communication;
obtain a second priority ranking of second data scheduled for a second data transmission from a third scheduled entity to a fourth scheduled entity using at least the portion of the sidelink resource reserved for sidelink communication; and
schedule a first data transmission of the first data using at least the portion of the sidelink resource based on the first priority ranking and the second priority ranking.

24. The apparatus of claim 23, wherein the processor is further configured to:
send a transmission cancellation indication to cancel the second data transmission if:
the first priority ranking represents a greater priority than the second priority ranking,
the first data transmission will collide with the second data transmission, or
a predicted level of interference at the second scheduled entity from the second data transmission is greater than a predetermined threshold.

25. The apparatus of claim 24, wherein the processor is further configured to:
send the transmission cancellation indication to at least one of:
at least the third scheduled entity,
scheduled entities including the third scheduled entity scheduled to transmit in at least the portion of the sidelink resource, or
a portion of the scheduled entities including the third scheduled entity scheduled to transmit in at least the portion of the sidelink resource that will cause interference with a reception of the first data.

26. The apparatus of claim 24, wherein the processor is further configured to:
predict the level of interference using at least one of:
a sidelink interference graph,
a sidelink schedule,
a transmit beam transmitting the second data from the third scheduled entity to the fourth scheduled entity, or
a receive beam receiving the first data from the first scheduled entity at the second scheduled entity.

27. The apparatus of claim 23, wherein the processor is further configured to:
send a preemption indication to indicate that receiving scheduled entities including the fourth scheduled entity are to ignore data including the second data received during at least the portion of the sidelink resource.

28. The apparatus of claim 27, wherein the processor is further configured to:
send the preemption indication to at least one of:
at least the fourth scheduled entity,
scheduled entities including the fourth scheduled entity scheduled to receive in at least the portion of the sidelink resource, or
a portion of the scheduled entities including the fourth scheduled entity scheduled to receive in at least the portion of the sidelink resource that will receive interference from the first data transmission.

29. The apparatus of claim 23, wherein the processor is further configured to:
instruct the third scheduled entity to send a preemption indication to indicate that receiving scheduled entities including the fourth scheduled entity are to ignore data including the second data received during at least the portion of the sidelink resource.

30. The apparatus of claim 29, wherein the processor is further configured to:
instruct the third scheduled entity to send the preemption indication to at least one of:
at least the fourth scheduled entity,
scheduled entities including the fourth scheduled entity scheduled to receive in at least the portion of the sidelink resource, or
a portion of the scheduled entities scheduled including the fourth scheduled entity scheduled to receive in at least the portion of the sidelink resource that will receive interference from the first data transmission.

* * * * *